(12) United States Patent
Ueda et al.

(10) Patent No.: US 10,945,368 B2
(45) Date of Patent: Mar. 16, 2021

(54) COMBINE HARVESTER AND GRAIN YIELD MANAGEMENT SYSTEM FOR COMBINE HARVESTER

(71) Applicant: Kubota Corporation, Osaka (JP)

(72) Inventors: Mao Ueda, Sakai (JP); Kazuhiro Takahara, Sakai (JP); Yoshimasa Ando, Sakai (JP)

(73) Assignee: Kubota Corporation, Osaka (JP)

( * ) Notice: Subject to any disclaimer, the term of this patent is extended or adjusted under 35 U.S.C. 154(b) by 285 days.

(21) Appl. No.: 15/776,370

(22) PCT Filed: Dec. 20, 2016

(86) PCT No.: PCT/JP2016/087972
§ 371 (c)(1),
(2) Date: May 15, 2018

(87) PCT Pub. No.: WO2017/110818
PCT Pub. Date: Jun. 29, 2017

(65) Prior Publication Data
US 2019/0183046 A1 Jun. 20, 2019

(30) Foreign Application Priority Data
Dec. 25, 2015 (JP) .............................. JP2015-254610

(51) Int. Cl.
*A01D 41/127* (2006.01)
*A01F 12/46* (2006.01)
*A01D 41/12* (2006.01)

(52) U.S. Cl.
CPC ....... *A01D 41/1272* (2013.01); *A01D 41/127* (2013.01); *A01D 41/1208* (2013.01); *A01F 12/46* (2013.01)

(58) Field of Classification Search
CPC ............ A01D 41/1272; A01D 41/1208; A01D 41/127; A01F 12/46
See application file for complete search history.

(56) References Cited

U.S. PATENT DOCUMENTS 5,343,761 A * 9/1994 Myers .................... A01C 7/105
73/861
5,351,558 A * 10/1994 Horn ........................ G01G 7/06
73/861

(Continued)

FOREIGN PATENT DOCUMENTS

EP          0958729 A1     11/1999
EP          1400161 A1      3/2004

(Continued)

*Primary Examiner* — Alicia Torres
(74) *Attorney, Agent, or Firm* — The Webb Law Firm

(57) ABSTRACT

A combine harvester includes: a grain conveyance mechanism for conveying grains from a threshing apparatus to a grain tank; a grain discharge apparatus provided in an end area of the grain conveyance mechanism, the grain discharge apparatus having a discharge case provided with a grain discharge opening, and a discharge rotor rotatably arranged in the discharge case; a pressed portion that is subjected to a pressing force applied by grains immediately before the grains are discharged by the discharge rotor; a load detector for detecting the pressing force exerted on the pressed portion; and a yield evaluator for evaluating the amount of conveyed grain based on a detection signal from the load detector.

10 Claims, 18 Drawing Sheets

(56) References Cited

U.S. PATENT DOCUMENTS

| | | | |
|---|---|---|---|
| 5,686,671 A * | 11/1997 | Nelson | G01F 1/30 73/861.73 |
| 6,192,664 B1 | 2/2001 | Missotten et al. | |
| 6,460,008 B1 * | 10/2002 | Hardt | A01D 41/1272 460/1 |
| 6,899,616 B1 * | 5/2005 | Murray | A01D 75/28 460/6 |
| 2003/0158684 A1 | 8/2003 | Livingston | |
| 2004/0050138 A1 | 3/2004 | Beck et al. | |
| 2005/0003875 A1 | 1/2005 | Beck et al. | |
| 2006/0179955 A1 | 8/2006 | Beck et al. | |
| 2010/0110428 A1 * | 5/2010 | Priesnitz | A01D 41/1277 356/328 |
| 2013/0317696 A1 | 11/2013 | Koch et al. | |
| 2014/0174199 A1 | 6/2014 | Strnad et al. | |
| 2015/0168187 A1 * | 6/2015 | Myers | G01F 1/80 73/861.73 |
| 2015/0242799 A1 | 8/2015 | Seki et al. | |
| 2015/0366140 A1 * | 12/2015 | Strnad | G01F 1/30 460/114 |
| 2016/0037720 A1 | 2/2016 | Koch et al. | |
| 2016/0066507 A1 | 3/2016 | Inoue et al. | |
| 2016/0143222 A1 * | 5/2016 | Koch | G01B 5/14 29/464 |
| 2017/0074700 A1 | 3/2017 | Strnad et al. | |
| 2017/0265391 A1 | 9/2017 | Koch et al. | |
| 2018/0177125 A1 | 6/2018 | Takahara et al. | |
| 2020/0000031 A1 | 1/2020 | Koch et al. | |

FOREIGN PATENT DOCUMENTS

| | | |
|---|---|---|
| JP | 2000354416 A | 12/2000 |
| JP | 2001224242 A | 8/2001 |
| JP | 2004129522 A | 4/2004 |
| JP | 2005130776 A | 5/2005 |
| JP | 2008212102 A | 9/2008 |
| JP | 2014067308 A | 4/2014 |
| JP | 2014212749 A | 11/2014 |
| JP | 2015177750 A | 10/2015 |
| JP | 2015204806 A | 11/2015 |
| WO | 2012088405 A1 | 6/2012 |
| WO | 2014174869 A1 | 10/2014 |
| WO | 2016147521 A1 | 9/2016 |

* cited by examiner

COMBINE HARVESTER AND GRAIN YIELD MANAGEMENT SYSTEM FOR COMBINE HARVESTER

This application is the United States national phase of International Application No. PCT/JP2016/087972 filed Dec. 20, 2016, and claims priority to Japanese Patent Application Nos. 2015-254610 and 2015-254614, both filed Dec. 25, 2015, the disclosures of which are hereby incorporated in their entirety by reference.

TECHNICAL FIELD

The present invention relates to a combine harvester and a grain yield management system for a combine harvester.

BACKGROUND ART

[1] Each of Patent Literature 1 and Patent Literature 2 discloses a combine harvester that evaluates an amount of grain obtained by threshing reaped grain culms, while the combine harvester is traveling.

[2] Each of Patent Literature 3 and Patent Literature 4 discloses a combine harvester provided with a system that evaluates a yield distribution status of harvested grains in a field, while the combine harvester is traveling.

PRIOR ART DOCUMENTS

Patent Literatures

Patent Literature 1: JP 2000-354416 A
Patent Literature 2: JP 2015-204806 A
Patent Literature 3: JP 2015-177750 A
Patent Literature 4: JP 2014-212749 A (or see WO 2014/174869 A1 or US 2016/0066507 A1 corresponding thereto)

SUMMARY OF THE INVENTION

Problem to be Solved by the Invention

[1] A problem corresponding to the background art [1] is as follows.

In the combine harvester disclosed in Patent Literature 1, a grain sensor is arranged on the lower side where grains conveyed to the upper side of a grain tank by a screw conveyer freely fall down, and the amount of grain is continuously detected based on a signal from this grain sensor. Although the structure of the grain sensor is not disclosed, it can be understood from FIG. 1 in Patent Literature 1 that the grain sensor generates a signal as a result of freely falling grains colliding therewith. In the case where freely falling grains are thus to be detected, if the amount of conveyed grain changes, the grain density in a center area of the free-fall trajectory may not significantly change even if the grain density in a peripheral area of the free-fall trajectory changes. Consequently, the amount of conveyed grain may not be correctly measured. In addition, since a travelling combine harvester shakes, there is also shaking in the flow of freely falling grains. This also makes it difficult to conduct accurate measurement.

The combine harvester disclosed in Patent Literature 2 is provided with a rotary blade for discharging, from a grain discharge opening, grains conveyed from a threshing apparatus by a screw conveyer. A sensor for detecting, with a strain gauge, impact between the sensor and the grains discharged by the rotary blade is provided in the grain tank. The amount of grain is calculated by a controller based on a voltage from this strain gauge. With this configuration as well, the relationship between the impact amount according to the flow of grains discharged by the rotary blade and the amount of grain tends to vary, and it is difficult to accurately measure the grain conveyance status.

In view of the foregoing situation, there is a demand for a technique for readily, accurately and continuously detecting the amount of grain fed from the threshing apparatus to the grain tank.

[2] A problem corresponding to the background art [2] is as follows.

The combine harvester disclosed in Patent Literature 3 is provided with a measuring device for measuring the weight of a grain tank for accumulating harvested grains, and the amount (yield) of grain accumulated in the grain tank is calculated based on the measurement result from the measuring device. At this time, the measurement performed while the combine harvester is traveling for harvest is regarded as a less-reliable measurement, and the obtained yield is displayed as a provisional yield during travel for harvest. On the other hand, measurement performed in a state where the combine harvester is stopped while assuming a horizontal orientation is regarded as reliable measurement, and the obtained yield is recorded as an official yield. However, the yield obtained by such reliable measurement is a yield over a wide area of a field, and a yield distribution in a small parcel (a minute parcel or a fraction) in the field cannot be generated by using such a yield.

The combine harvester disclosed in Patent Literature 4 is provided with a yield measurement container that receives at least some of the grains discharged to a grain tank. Accumulation time during which a predetermined volume of grain is accumulated in this yield measurement container is calculated, and a yield per unit of travel, which is a yield per unit of travel distance, is calculated based on the accumulation time and travel speed. The yield per minute parcel or fraction, which are obtained by dividing a field into predetermined sizes, and thus a yield distribution in the field can be obtained based on the yield per unit of travel and reaping width. However, with this measurement method, an error may occur in the calculation of the yield per unit of travel if the route through which the grains discharged to the grain tank take changes. Moreover, if rachises or the like are mixed in the grains in the yield measurement container, the predetermined volume of accumulated grain cannot be correctly measured. Thus, there is a problem in that the yield per unit of travel cannot be accurately measured depending on the situation during the measurement.

In view of the foregoing situation, there is a demand for a grain yield management system for a combine harvester that can accurately obtain information regarding a grain yield in a field from each minute parcel.

Solution to the Problem

[1] A solution proposed corresponding to the problem [1] is as follows.

A combine harvester according to the present invention includes: a threshing apparatus; a grain tank for accumulating grains threshed by the threshing apparatus; a grain conveyance mechanism for conveying grains from the threshing apparatus to the grain tank; a pressed portion that is subjected to a pressing force applied by grains in a conveyance path in the grain conveyance mechanism; a load detector for detecting the pressing force exerted on the pressed portion; and a yield evaluator for evaluating an amount of conveyed grain based on a detection signal from the load detector.

With this configuration, the pressed portion is subjected to a pressing force (hereinafter also referred to as "pressure force") applied by grains in the conveyance path in the grain conveyance mechanism. The pressing force exerted on the grains by the grain conveyance mechanism increases the larger the grain amount, and decreases the smaller the grain amount. Accordingly, if a load applied to the pressed portion is detected by the load detector, the amount of grain conveyed from the threshing apparatus to the grain tank can be evaluated based on the detection signal from the load detector. Note that the evaluation values for the amount of conveyed grain include data indicating the amount (yield) of grain per unit of time, data indicating a change, i.e. an increase and a decrease in the grain yield over time, or the like.

In a preferable embodiment of the present invention, the combine harvester further includes a grain discharge apparatus provided in an end area of the grain conveyance mechanism, the grain discharge apparatus having a discharge case provided with a grain discharge opening, and a discharge rotor rotatably arranged in the discharge case, wherein the pressed portion is subjected to a pressing force applied by grains before the grains are discharged by the discharge rotor. In this case, it is more preferable that the pressed portion is subjected to a pressing force applied by grains immediately before the grains are discharged by the discharge rotor. With this configuration, grains are discharged from the grain discharge opening into the grain tank due to rotational motion of the discharge rotor. When grains are moved toward the grain discharge opening due to the rotational motion of the discharge rotor, the grains are pressed against the discharge rotor. The pressing force exerted on the grains by the discharge rotor increases the larger the grain amount, and decreases the lower the grain amount.

The pressure force the grains are subjected to, when being discharged by the discharge rotor, is transmitted to the discharge case via the grains. For this reason, the amount of conveyed grain can be favorably evaluated by detecting the load applied to the discharge case. Accordingly, in a preferable embodiment of the present invention, a plate-shaped member that serves as the pressed portion is attached to the discharge case at a position immediately forward of the grain discharge opening in a direction in which grains are conveyed. The pressing force applied by grains passing between the discharge rotor and the pressed portion is exerted on the pressed portion.

A combination of a pressure sensitive plate that is elastically deformed by the load applied to the plate-shaped member and a load cell for detecting distortion of this pressure sensitive plate is suitable for reliable detection of this load with a simple configuration. In this case, the load detecting structure can be simplified by using the plate-shaped member as the pressure sensitive plate. Accordingly, in a preferable embodiment of the present invention, the plate-shaped member is formed as a pressure sensitive plate extending in a rotational direction of the discharge rotor, and the load detector is a load cell provided in the pressure sensitive plate. Also, in a preferable embodiment of the present invention, the plate-shaped member spans one end portion and another end portion of the grain discharge opening in a rotation axis direction of the discharge rotor.

In a preferable embodiment of the present invention, the discharge case is a cylindrical body having a cylindrical portion with a center that is a rotation axis of the discharge rotor, the cylindrical body extending along the rotation axis, the grain discharge opening is provided in a portion of an inner circumferential face of the cylindrical body, and the pressed portion is provided in a circumferential face portion of the inner circumferential face, the circumferential face portion being located forward of the grain discharge opening in a rotational direction of the discharge rotor. The pressure force applied to the discharge case via grains by the discharge rotor significantly changes in an area forward of the grain discharge opening. Accordingly, arranging the pressed portion in an area forward of the grain discharge opening is advantageous in achieving high detection accuracy.

Changes in the pressure force occurring on the pressed portion depend on the rotation of the discharge rotor. That is to say, the detected load changes depending on the rotation angle of the discharge rotor. Accordingly, it is favorable, in terms of instrument engineering, to process the detection signal while giving consideration to the rotation cycle of this discharge rotor to evaluate the amount of conveyed grain. Accordingly, in a preferable embodiment of the present invention, the yield evaluator evaluates the amount of conveyed grain per rotation cycle of the discharge rotor, based on the detection signal from the load detector in the rotation cycle.

Since the detection signal is cyclic, it is preferable that the evaluation of the amount of conveyed grain is based on the largest value of the detection signal in a predetermined cycle. The cyclic property of the detection signal corresponds to the rotation cycle of the discharge rotor. Accordingly, in a preferable embodiment of the present invention, the yield evaluator evaluates the amount of conveyed grain per unit of travel distance by integrating a largest value of the detection signal from the load detector obtained every rotation cycle, during a period of time it takes for the combine harvester to travel the unit of travel distance.

Regarding a simple and preferable structure of the discharge rotor, it is proposed that the discharge rotor is a rotary blade constituted by a rotary shaft and a blade provided on the rotary shaft, and the rotary blade has a grain pushing face for pushing out grains in a rotational direction. In this case, to preferably detect and evaluate the load that changes cyclically, it is proposed, as a preferable embodiment of the present invention, the combine harvester further includes a rotation angle sensor for detecting a rotation angle of the rotary blade, wherein the rotation angle sensor is a sensor that detects a specific point in a circumferential direction of the rotary blade, and the yield evaluator calculates a rotation cycle of the discharge rotor based on the specific point in the circumferential direction, and regards a period in which a largest value of the detection signal from the load detector is generated in the rotation cycle of the discharge rotor as a period evaluated by the yield evaluator. In this case, it is more preferable that, at a time point near a middle point in a period from when a pulse signal that is based on the detection signal from the rotation angle sensor is generated until the next pulse signal is generated, the blade passes the pressed portion, and the detection signal from the load detector takes its largest value.

[2] A solution proposed corresponding to the problem [2] is as follows.

A grain yield management system for a combine harvester according to the present invention includes: a threshing apparatus; a grain accumulator; a grain conveyance mechanism for conveying grains from the threshing apparatus to the grain accumulator; a conveyed grain measurement apparatus for measuring an amount of grain conveyed by the grain conveyance mechanism during travel for reaping grain culms; an accumulated grain measurement apparatus for measuring an amount of grain accumulated in the grain accumulator; and an information generator for generating grain yield information regarding a field subjected to harvesting work, based on conveyed grain measurement data outputted from the conveyed grain measurement apparatus and accumulated grain measurement data outputted from the accumulated grain measurement apparatus.

With this configuration, a changing state of the grain yield along the travel trajectory of the combine harvester can be obtained during reaping travel of the combine harvester, based on the conveyed grain measurement data obtained by measuring the grains conveyed to the grain accumulator. Since the measurement results obtained during travel for reaping work of the combine harvester are indicated in the conveyed grain measurement data, a chronological change in the measurement results, i.e. the tendency regarding the increase/decrease in the grain yield along the travel trajectory of the combine harvester, can be obtained with a relatively small error. However, measurement may be influenced by vibrations occurring due to travel, and it may not be possible to completely measure the amount of all of the grains, and accordingly, there may be cases where the entire yield of conveyed grains cannot be accurately measured. In this regard, measurement by the accumulated grain measurement apparatus is usually performed in a state where the combine harvester is stopped and stable. As a result, the accumulated grain measurement data and the grain yield calculated that is based thereon are highly accurate. By combining different types of measurement data, namely the conveyed grain measurement data and the accumulated grain measurement data, it is possible to generate grain yield information that contains an accurate grain yield in part of or the entire field, or increasing/decreasing behavior of the grain yield with minute field parcels serving as the resolution.

In a preferable embodiment of the present invention, the accumulated grain measurement apparatus continuously performs measurement during travel for reaping grain culms, and the information generator includes a yield distribution calculator for calculating a distribution of a grain yield per parcel unit in the field based on the conveyed grain measurement data. For example, change data indicating a change in the grain yield in the entire field can be obtained by obtaining a difference between the conveyed grain measurement data that is continuously obtained, and reference grain yield data (a predetermined value or any value selected from the conveyed grain measurement data), and assigning this difference to the travel trajectory of the combine harvester. The distribution of the grain yield per parcel unit in the field can be calculated based on this change data. For example, if a map indicating such a grain yield distribution is created, whether or not the growth state at a specific location in the field is good can be determined using the map, and the determination result is available as useful data when making the next agricultural plans such as a fertilizing plan.

In a preferable embodiment of the present invention, the information generator includes a corrector for correcting the conveyed grain measurement data, based on a comparative evaluation value that is obtained by comparing and evaluating integrated data obtained by integrating the conveyed grain measurement data with the accumulated grain measurement data. The conveyed grain measurement data is useful as data that accurately indicates the tendency regarding the increase/decrease of the grain yield along the travel trajectory of the combine harvester, but the grain yield that is calculated directly based on the conveyed grain measurement data is not necessarily accurate. However, by correcting the conveyed grain measurement data using the accumulated grain measurement data that indicates an accurate grain yield, the grain yield in a minute parcel in the field can also be accurately obtained based on the conveyed grain measurement data.

Specifically, the corrector corrects each piece of the conveyed grain measurement data so that a grain yield, obtained by integrating a conveyed grain measurement data group outputted until the accumulated grain measurement data is outputted, is equal to a grain yield that is based on the accumulated grain measurement data. With this configuration, a grain yield in a minute parcel in the field that has been corrected using the accurate accumulated grain measurement data can be obtained. At the time of this correction, it is more preferable to make the ratio between the respective pieces of conveyed grain measurement data substantially constant.

The threshing apparatus, the grain accumulator, the grain conveyance mechanism, the conveyed grain measurement apparatus, and the accumulated grain measurement apparatus, which are main constituent elements of the grain yield management system for a combine harvester according to the present invention, are provided in a combine harvester. However, the information generator may not necessarily be provided in the combine harvester. The information generator can be provided in, for example, an apparatus capable of receiving, from the combine harvester, the conveyed grain measurement data, the accumulated grain measurement data, and data regarding positions in the field that are associated with these pieces of measurement data. For example, the information generator may also be a computer device (personal computer, tablet, smartphone etc.) capable of data communication with the combine harvester. In the case where, for example, the data volume and the amount of data processing are relatively large, or where the number of fields to be managed is not negligible, it is particularly preferable that the information generator is constructed in a remote computer system in a remote place that is capable of wireless data communication with the combine harvester.

EMBODIMENTS OF THE INVENTION

First Embodiment

The first embodiment will be described below.

Figure 1:
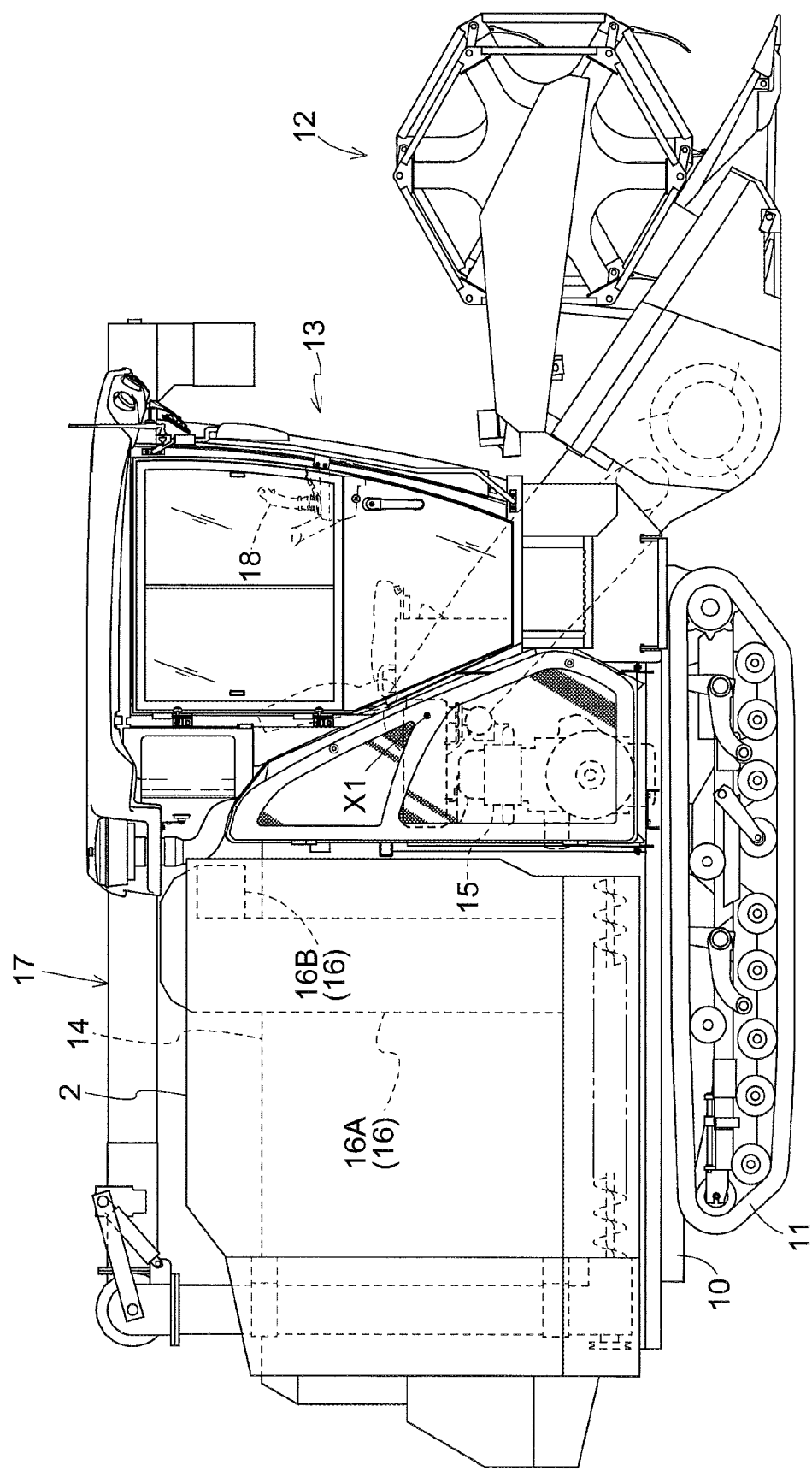
FIG. 1 is related to a first embodiment (which also applies to FIGS. 2 to 12) and is a right side view of a combine harvester.
Figure 2:
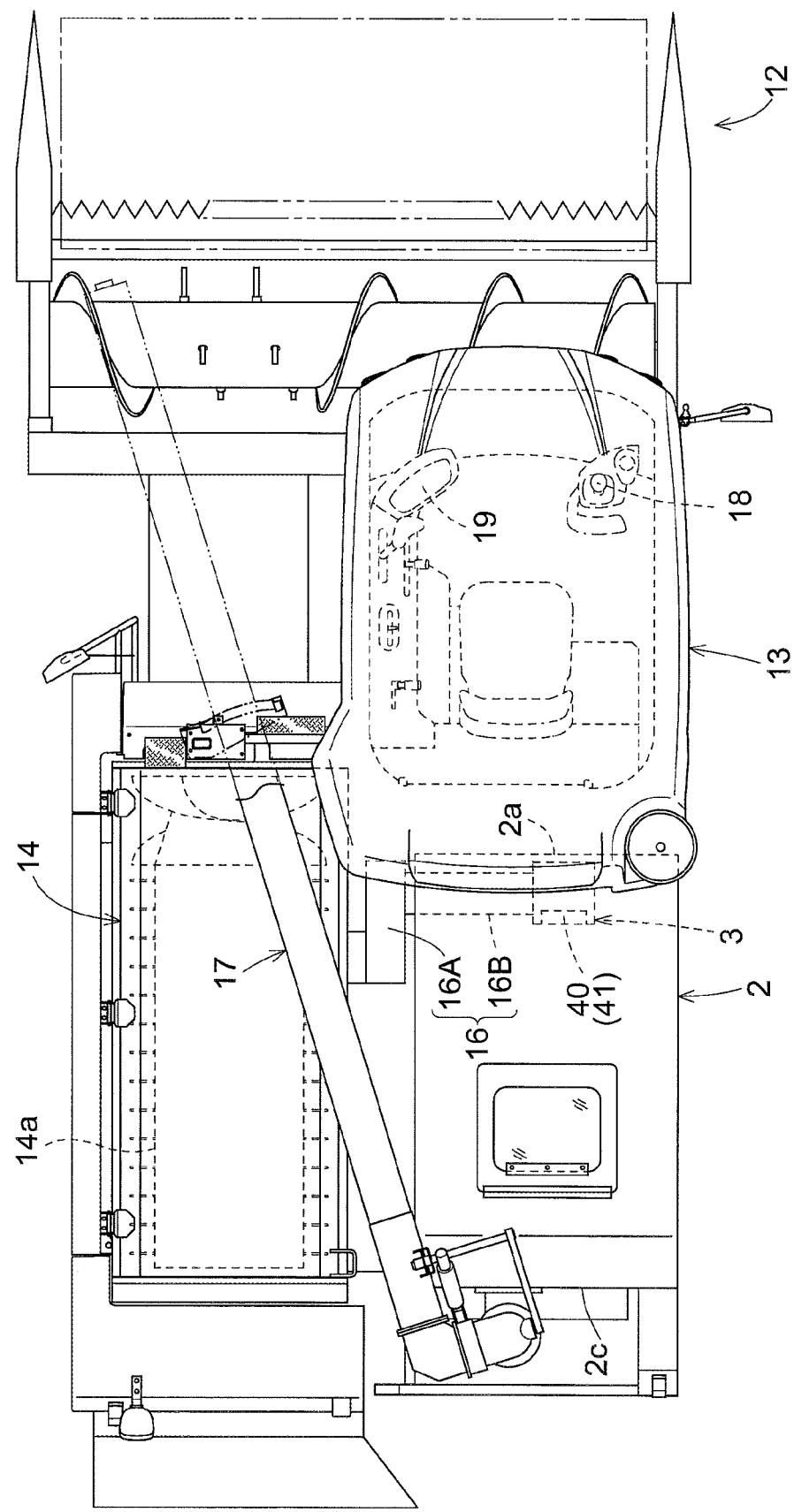
FIG. 2 is a plan view of the combine harvester.

FIG. 1 is a side view of a normal combine harvester, which is an example of a combine harvester, and FIG. 2 is a plan view thereof. This combine harvester includes a body frame 10, which is formed by connecting a plurality of steel materials such as channel-shaped materials and square pipe materials. A pair of right and left crawler traveling apparatuses 11 are installed below the body frame 10. An engine 15 is mounted on the front side of a right half portion of the body frame 10, and an operation unit 13, which is configured as a cabin, is formed thereabove.

An operation lever 18, a monitor 19, and so on, are arranged in the operation unit 13. A reaper 12 is installed in a front portion of the body frame 10 so as to be able to be raised and lowered. A threshing apparatus 14 for threshing whole reaped grain culms that are supplied from the reaper 12 and then thrown therein, a grain tank 2 for accumulating threshed grains supplied from the threshing apparatus 14 by a grain conveyance mechanism 16, and an unloader 17 for discharging the grains accumulated in the grain tank 2 to the outside are installed in a rear portion of the body frame 10.

The reaper 12 is configured to be able to be raised and lowered in an up-down direction around a lateral axis X1, which extends horizontally relative to the machine body. The reaper 12 is in a raised state during non-harvesting work, such as when turning around, and is in a lowered state and comes close to the field surface during harvesting operation. Grain culms reaped by the reaper 12 is conveyed to a front end portion of the threshing apparatus 14.

The threshing apparatus 14 is configured to perform a threshing process on the reaped grain culms conveyed from the reaper 12, using a threshing cylinder 14a that is driven to rotate. The grain tank 2 is arranged above a right rear portion of the body frame 10, and is located on the right side of the threshing apparatus 14 and on the rear side of the operation unit 13. The grain conveyance mechanism 16 for conveying grains from the threshing apparatus 14 to the grain tank 2 is arranged between the threshing apparatus 14 and the grain tank 2.

Figure 3:
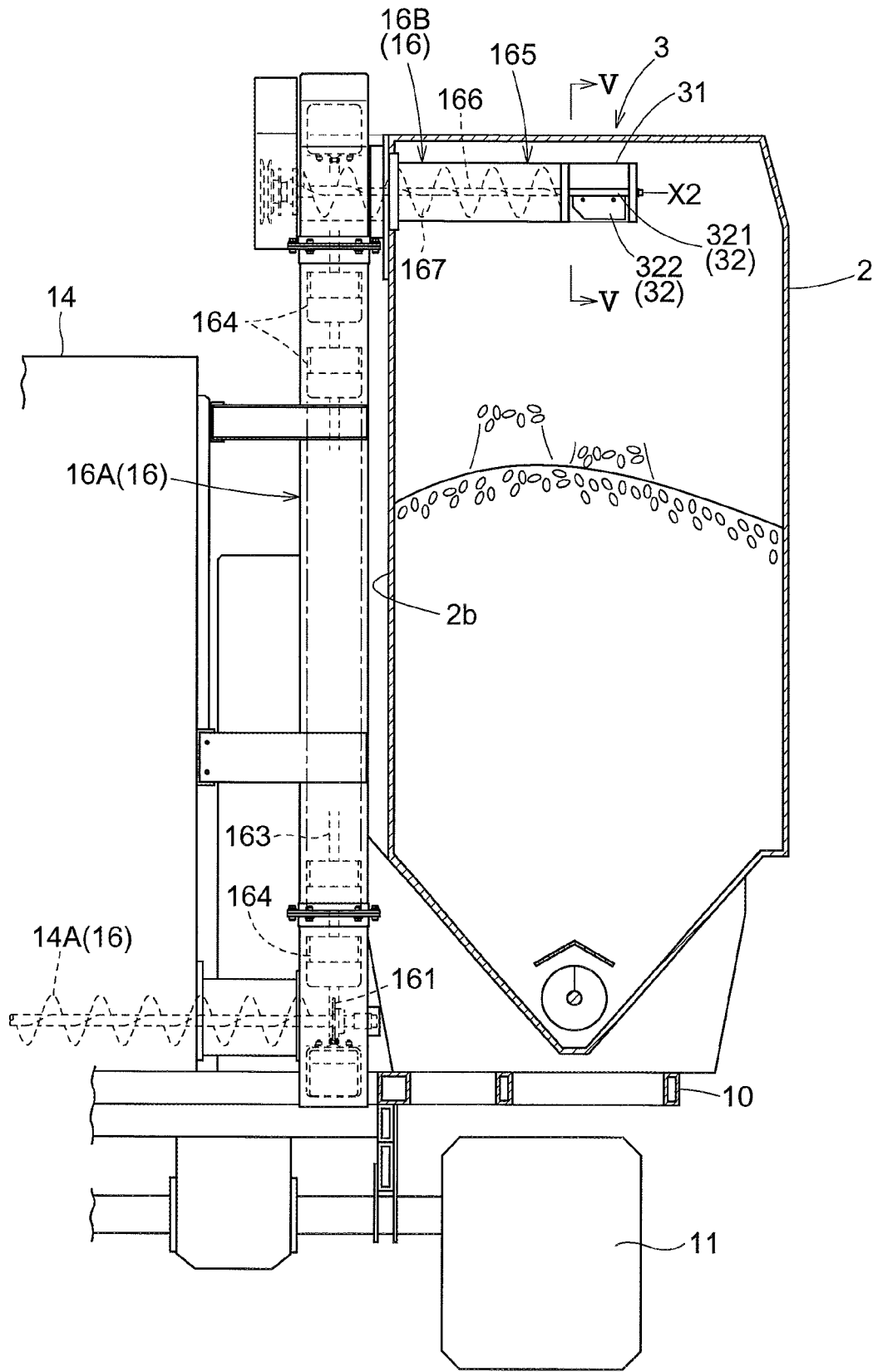
FIG. 3 is a view illustrating a rear view of the combine harvester, showing a grain conveyance mechanism and a grain tank.
Figure 4:
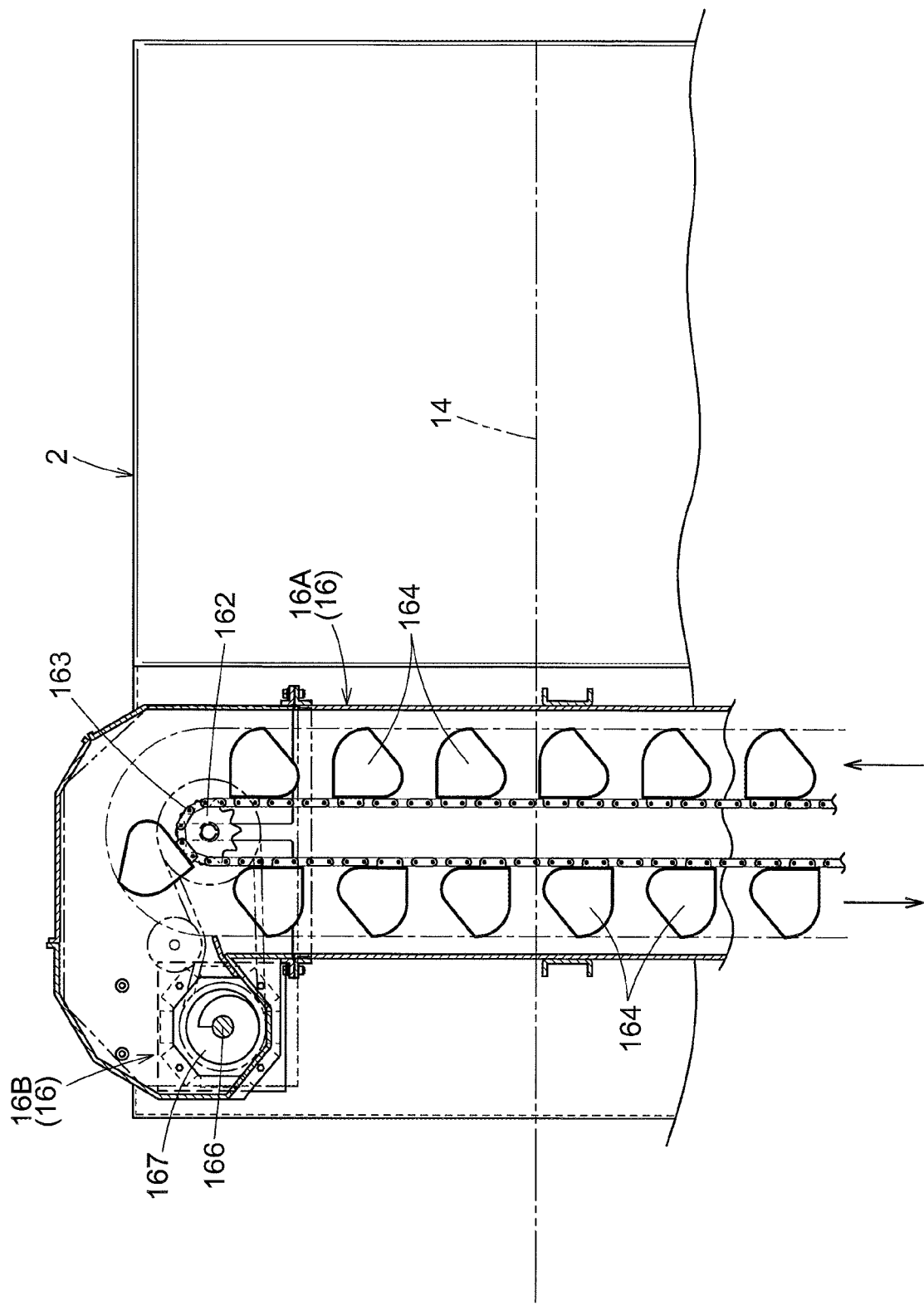
FIG. 4 is a view illustrating a left side view of the combine harvester, showing the grain conveyance mechanism and the grain tank.

As shown in FIGS. 3 and 4, the grain conveyance mechanism 16 includes a clean grain collection screw 14A, which is provided at the bottom of the threshing apparatus 14, a lift conveyor 16A, and a horizontal feed conveyor 16B. The lift conveyor 16A is substantially vertically erected in order to upwardly feed grains discharged from the threshing apparatus 14. The lift conveyor 16A is a bucket conveyer in which a plurality of buckets 164 are attached at even intervals to the outer circumferential side of the endless rotary chain 163, which is wound around the driving sprocket 161 and the driven sprocket 162.

The lift conveyor 16A is a bucket conveyer for upwardly feeding grains discharged from the threshing apparatus 14. The horizontal feed conveyor 16B is a screw conveyer that is connected to a conveyance terminal of the lift conveyor 16A and feeds, into the grain tank 2, the grains transferred from the lift conveyor 16A. The horizontal feed conveyor 16B horizontally extends from the upper end of the lift conveyor 16A, and is inserted in the upper front portion of a left side wall 2b of the grain tank 2. The outer circumferential portion of the horizontal feed conveyer 16B is surrounded by a casing 165 having a circular (or octagonal, or any other polygonal) cross-sectional shape. The horizontal feed conveyor 16B includes a screw shaft 166 and a screw body 167, which is fixed to this screw shaft 166.

As shown in FIGS. 3 to 6, the grain discharge apparatus 3 for discharging grains in a dispersing manner within the grain tank 2 is provided in a terminal area of the horizontal feed conveyor 16B. The grain discharge apparatus 3 includes the discharge rotor 32, and the discharge case 31, which surrounds the periphery of the discharge rotor 32. The discharge rotor 32 is a rotary blade constituted by a rotary shaft 321, which extends from the screw shaft 166, and a blade 322 provided on the rotary shaft 321. The blade 322 is fixed to the rotary shaft 321 so as to project in a radially outward direction from the rotary shaft 321. The blade 322 has a substantially flat pressing face for pressing out grains in its rotational direction. The discharge case 31 has a cylindrical shape having an inner diameter that is slightly larger than the rotation trajectory of the blade 322. Part of a circumferential face of the discharge case 31 is cut out. This cutout forms the grain discharge opening 30 for discharging grains to the rear side in the grain tank 2, using the rotation of the blade 322.

The screw shaft 166 and the rotary shaft 321 integrally rotate around a lateral axis X2. In this embodiment, the direction of this rotation is set as leftward rotation relative to the line of sight from a base end side toward a leading end side of the screw shaft 166 along the lateral axis X2. That is to say, the blade 322 rotates counterclockwise in FIG. 5.

In this embodiment, the rotation trajectory radius of the blade 322 and the rotation trajectory radius of the screw body 167 are substantially the same. For this reason, the discharge case 31 is a cylindrical tubular body, and is formed as an extension of the casing 165 of the horizontal feed conveyor 16B. Note that, if the rotation trajectory radius of the blade 322 is larger than the rotation trajectory radius of the screw body 167, the discharge case 31 is formed to have a larger diameter than that of the casing 165 of the horizontal feed conveyor 16B. In the opposite case, the discharge case 31 is formed to have a smaller diameter than that of the casing 165 of the horizontal feed conveyor 16B.

Figure 5:
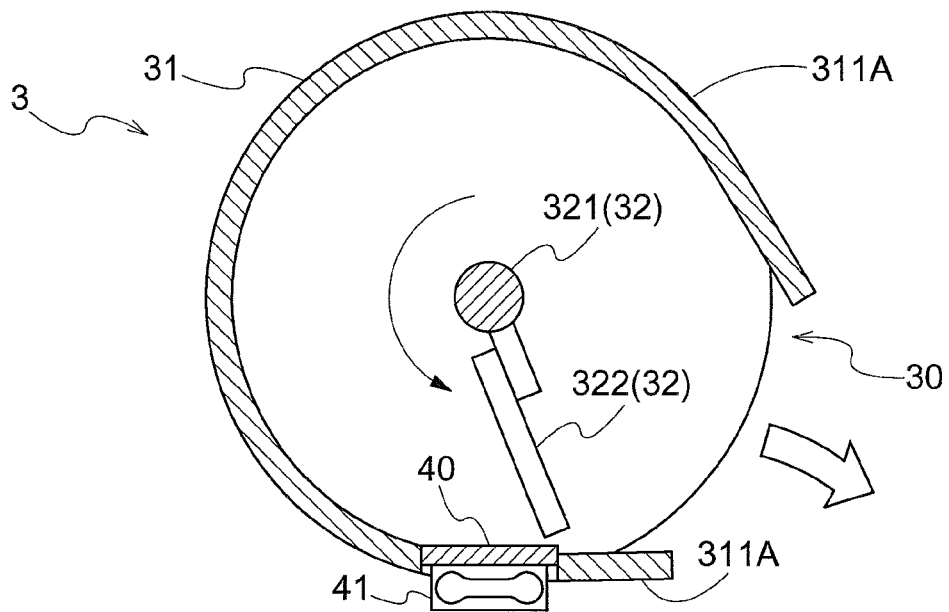
FIG. 5 is a view in vertical section of a grain discharge apparatus, taken along arrows V-V in FIG. 3.
Figure 6:
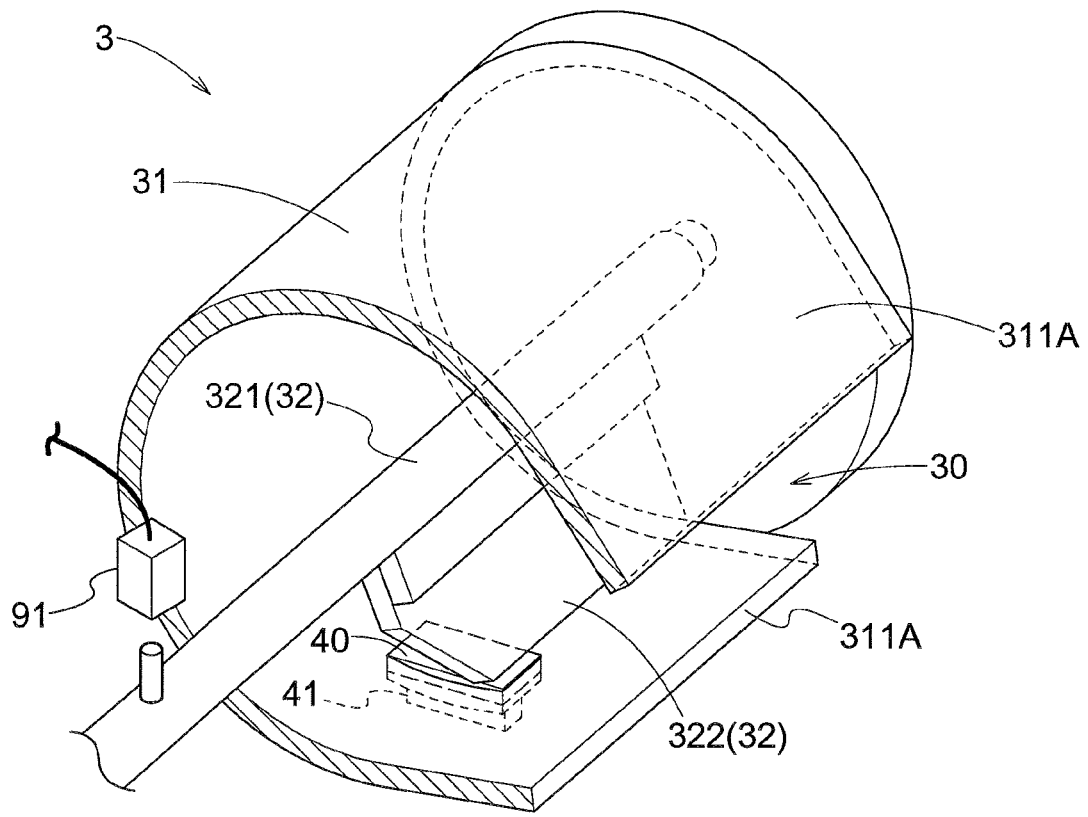
FIG. 6 is a perspective view of the grain discharge apparatus.

As shown in FIGS. 5 and 6, the grain discharge opening 30 is a cut-out opening that has substantially the same width as the blade 322 in the axial direction of the discharge case 31, and has a length in the circumferential direction that is substantially equal to one-fourth of the circumference thereof from the lower end in the circumferential direction of the discharge case 31. Grains that are fed while being pushed by the blade 322 are discharged from the discharge case 31 into the grain tank 2 through this grain discharge opening 30. To form a nozzle that defines the direction in which the grains are discharged from the discharge case 31, discharge guide pieces 311A, which extend from the discharge case 31 in a tangent line direction of the rotation trajectory of the blade 322, are formed at both edge portions in the circumferential direction of the grain discharge opening 30.

As shown in FIG. 6, an opening that extends in the rotational direction of the blade 322 is provided within the width in the axial direction of the blade 322, in a circumferential wall portion of the discharge case 31 that is located forward of the grain discharge opening 30 in the rotational direction of the blade 322. A pressed portion 40, which is subjected to a pressing force applied by grains in the conveyance path in the grain conveyance mechanism 16, is attached to this opening. That is to say, the pressed portion 40 is configured to be subjected to a pressing force applied by grains before the grains are discharged by the discharge rotor 32 (more specifically, immediately before the grains are discharged). The pressed portion 40 is formed using a plate-shaped member.

In this regard, a structure in which the pressed portion 40 is fitted into the opening may also be employed in order to not form a step between an inner face of the circumferential wall of the discharge case 31 and an inner face of the pressed portion 40. Furthermore, a load cell, which serves as a load detector 41 for detecting the load applied to the pressed portion 40, is provided in an outer face of the pressed portion 40. When grains are discharged by the blade 322, the pressure force applied to the grains by the rotational force of the blade 322 is transmitted to the pressed portion 40 via the grains. The pressure caused by this pressure force causes distortion in the pressed portion 40. The pressing force applied to the grains by the blade 322 increases the greater the amount of grain conveyed by the grain conveyance mechanism 16. Accordingly, an electrical signal generated by the load cell due to the distortion of the pressed portion 40 has an intensity that depends on the amount of conveyed grain (amount of harvested grain; yield), and can then be handled as a detection signal for evaluating a change in the state of conveyed grains and the amount thereof.

In this embodiment, the plate-shaped member constituting the pressed portion 40 functions as a portion of the circumferential wall of the discharge case 31, and also functions as a pressure-sensitive plate for detecting a change in the pressure due to an increase and decrease of the grains. For this reason, the load detector 41 for detecting a load (pressing force) applied to the pressed portion 40 may not only be a load cell, but also any other kind of pressure-sensitive sensor.

Furthermore, as shown in FIG. 6, a rotation angle sensor 91 for detecting the rotation cycle of the blade 322, i.e. the cycle of the rotary shaft 321 is arranged in the periphery of the rotary shaft 321. The rotation angle sensor 91 is a sensor for optically or magnetically detecting an object to be detected, such as a projection, and is provided at a specific position in the circumferential direction of the rotary shaft 321. Based on a detection signal thereof, a pulse signal is generated that indicates a time point when the rotary shaft 321 passes through a specific point in the circumferential direction, or resultantly, a time point when the blade 322 passes therethrough.

Figure 7:
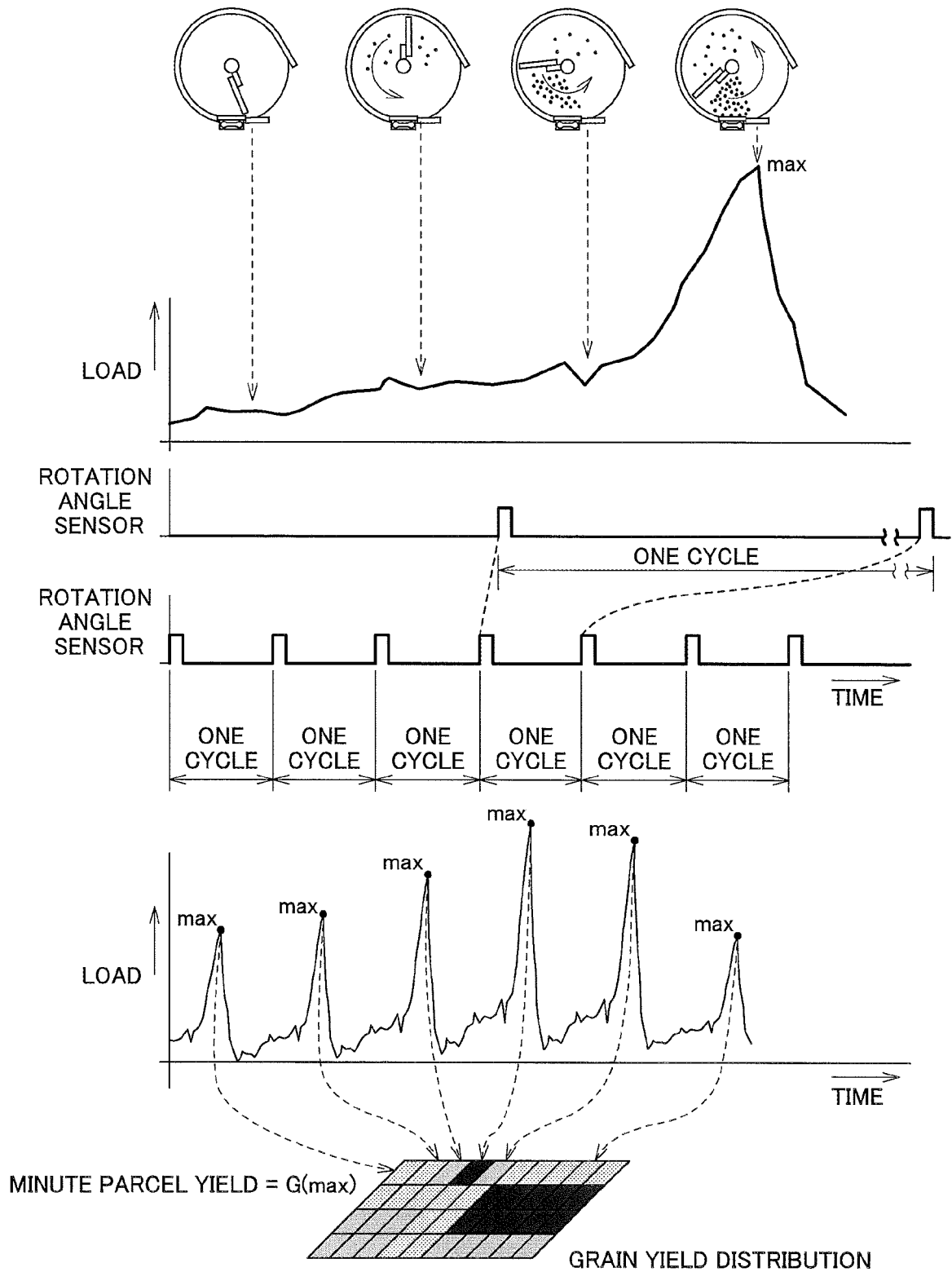
FIG. 7 is a view illustrating behavior of a detection signal from a load detector over time while grains are discharged.

FIG. 7 illustrates chronological behavior of a detection signal from the load detector 41 when grains are discharged. The upper graph in FIG. 7 schematically shows a detection signal (a voltage from the load cell) that is outputted by the load detector 41 within one rotation of the blade 322 (in one cycle). Immediately after the blade 322 has passed through the pressed portion 40, no large pressure force (load) is applied to the pressed portion 40, and the level of the detection signal accordingly is low. Grains that are continuously fed from the horizontal feed conveyor 16B to the grain discharge apparatus 3 are pressed toward the grain discharge opening 30 by the rotating blade 322. When the blade 322 passes the pressed portion 40, the force generated due to the pressing by the blade 322 is largest at the pressed portion 40. Accordingly, the detection signal of the load detector 41 at this time point is at its largest (max) in one cycle.

In FIG. 7, the blade 322 passes the pressed portion 40 only once in a period (hereinafter also called a pulse zone) from when the pulse signal based on the detection signal from the rotation angle sensor 91 is generated until the next pulse signal is generated. A peak that is to be detected as the largest value (max) (a peak reached immediately before grains are discharged) occurs once in each pulse zone. Here, the timing at which the peak to be detected as the largest value (max) occurs while the blade 322 rotates once (hereinafter also called a peak timing) may be slightly shifted. For this reason, if the timing at which a pulse signal is generated and the timing at which the detection signal from the load detector 41 reaches the largest value (max) are set to be close to each other, a situation may occur, due to a shift in the peak timing, where no peak to be detected as the largest value (max) is included in one pulse zone, or where two or more peaks are included in one pulse zone. In view of this, in this embodiment, the blade 322 is configured to pass through the pressed portion 40 at a time point near the midpoint of the pulse zone to obtain the peak timing, as shown in FIG. 7. With this configuration, even if the peak timing is slightly shifted, a situation rarely occurs where no peak to be detected as the largest value (max) is included in one pulse zone, or where two or more peaks are included in one pulse zone.

The lower graph in FIG. 7 schematically shows the detection signal (voltage from the load cell) outputted by the load detector 41 while the blade 322 rotates a plurality of times (a plurality of cycles). A change in the largest value (max) in the respective cycles represents a change in the amount of grain fed by the horizontal feed conveyor 16B, i.e. a change in the amount of harvest (yield), in units of minute parcels of a field.

Accordingly, signal processing including filtering processing is performed on the detection signal from the load detector 41, and the yield per unit of travel distance can be derived using a preset yield derivation map 63, based on the largest value (max) calculated for each rotation (in each cycle) of the blade 322. The content of the yield derivation map 63 changes depending on the travel speed of the combine harvester, the rotational speed of the blade 322, type of grain, or the like. In a simplest yield derivation map 63, the largest value (max) is linearly associated with the yield per unit of time (single rotation of the blade 322). Using this, the yield per unit of travel distance, i.e. the yield per unit of distance in the field, is obtained based on the derived yield per unit of time and the travel speed of the combine harvester. Furthermore, the yield per unit of area (minute parcel) (minute parcel yield=G(max)) of a field is obtained based on the yield per unit of distance and the reaping width of the combine harvester.

The culm reaping position (harvesting position) of the combine harvester that is traveling for reaping in a field can be acquired using the GPS (Global Positioning System) or the like. By obtaining, in advance, the delay time taken until grains taken out from reaped culms through threshing processing are discharged from the grain discharge opening 30, and tracing the travel trajectory of the combine harvester during this delay, the minute parcel of the field to which the aforementioned yield per unit of area (minute parcel) is to be assigned can be determined. Thus, ultimately, a grain yield distribution for a field can be generated.

Note that, in the case where the blade 322 rotates a plurality of times in a minute parcel (unit travel distance) of a field to which a yield is to be assigned, the largest value (max) obtained for each rotation (each cycle) is accumulated.

Figure 8:
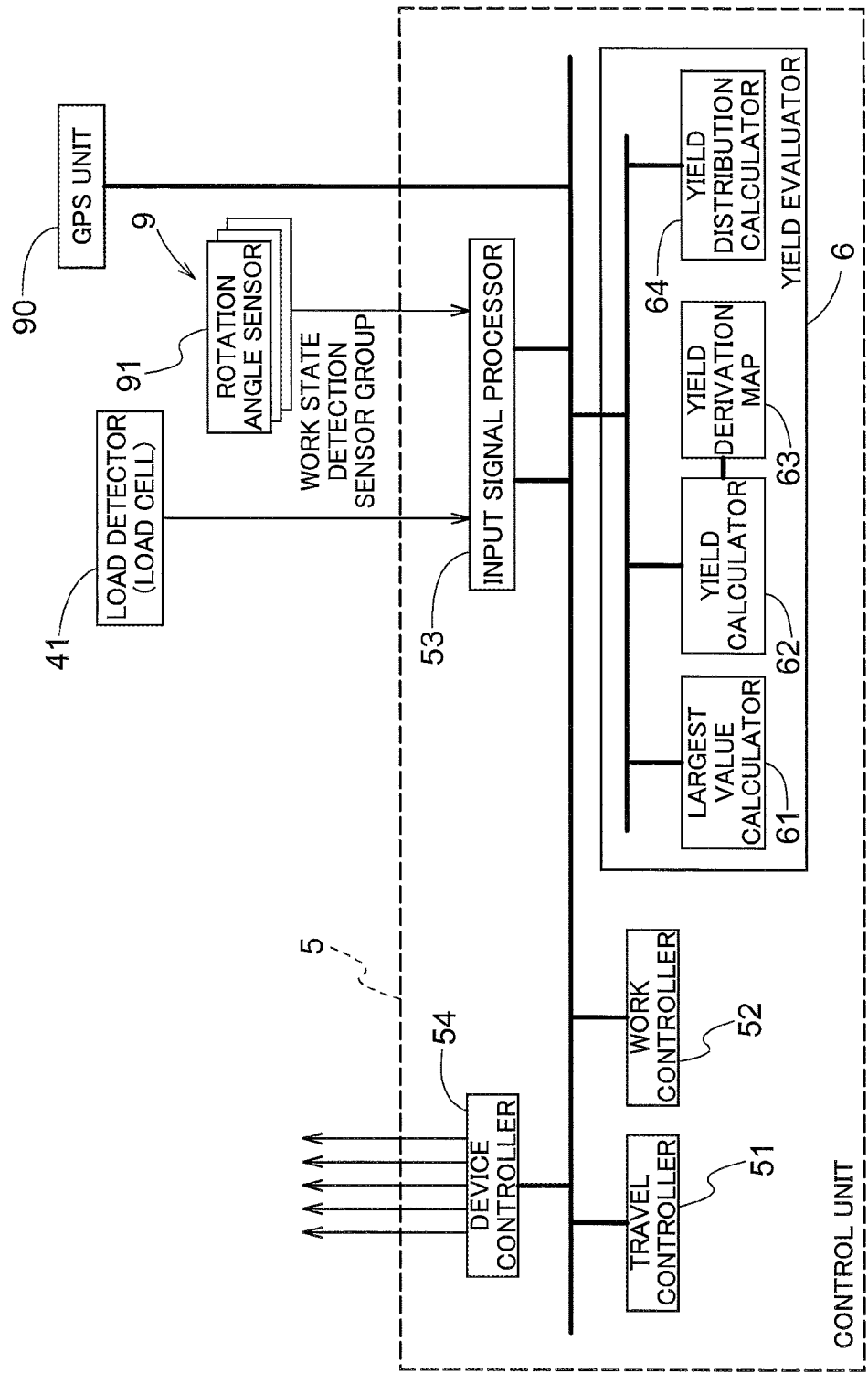
FIG. 8 is a functional block diagram showing functions of a control unit.

FIG. 8 shows some of the functional blocks in a control unit 5 of the combine harvester. The control unit 5 includes a travel controller 51 for controlling devices related to travel, a work controller 52 for controlling devices related to the work apparatuses, and an input signal processor 53, which serve as modules for controlling operations of devices in the combine harvester. Furthermore, in the control unit 5, a yield evaluator 6 for evaluating the amount of conveyed grain based on a detection signal from the load detector 41 is built as a functional module related to yield measurement. Control signals generated by the travel controller 51 and the work controller 52 are sent to various devices via a device controller 54. Signals from a manual operation device, signals from a work status detection sensor group 9, which include sensors, switches, or the like for detecting status of the devices constituting the combine harvester, and detection signals from the load detector 41, which is a load cell, are input to the input signal processor 53. The input signal processor 53 converts these inputs into data in a required data format, and thereafter transfers this data to the functional units in the control unit 5. This combine harvester includes a GPS unit 90 for detecting the vehicle position. The azimuth information acquired by the GPS unit 90 is also inputted to the control unit 5.

In this embodiment, the yield evaluator 6 includes a largest value calculator 61, a yield calculator 62, the yield derivation map 63, and a yield distribution calculator 64. A detection signal from the load detector 41, which is a load cell, after being subjected to amplification processing and filtering processing by the input signal processor 53 is inputted to the largest value calculator 61. The largest value calculator 61 also receives, via the input signal processor 53, a signal from the rotation angle sensor 91 for detecting a rotation cycle of the blade 322 in the grain discharge apparatus 3, and calculates the largest value (max) in each cycle.

In this embodiment, one blade 322 is provided on the rotary shaft 321. One pulse is generated every time the rotary shaft 321 makes a rotation, based on the detection signal from the rotation angle sensor 91. That is to say, one largest value (max) is calculated every 360-degree rotation cycle. It is possible to calculate, in advance, a relationship between the time point when this pulse is generated and the time point when the largest value (max) is generated. Accordingly, it is possible to set a largest value generation area with a given temporal width as a gate, and set this largest value generation area as an evaluation area for calculating the largest value (max).

The yield derivation map 63 is a lookup table for deriving the amount of grain fed by the horizontal feed conveyor 16B per unit of time, with the largest value (max) in one cycle of the blade 322 as an input value. If the rotational speed of the blade 322 is selectable, lookup tables are prepared for respective rotational speeds, or the output value is corrected with a correction coefficient, which is set in accordance with the rotational speed. The yield calculator 62 obtains the amount of grain (yield) per unit of time using the yield derivation map 63, based on the largest value (max) calculated by the largest value calculator 61. The yield calculator 62 can also acquire the vehicle speed and the reaping width of the combine harvester and obtain the amount of grain (yield) per unit of travel distance and per unit of area.

The yield calculator 62 calculates a field position at which culms corresponding to grains subjected to the yield calculation were reaped, based on the position information from the GPS unit 90, and records, as grain yield status information, this position information in association with the obtained amount of grain (yield). The yield distribution calculator 64 assigns a yield to each minute parcel (fraction) of the field and generates a grain yield distribution, based on the grain yield status information.

Variations of First Embodiment (1) In the above embodiment, the pressed portion 40 and the load detector 41 have a narrow width in the rotation axis direction of the blade 322. However, the "pressed portion (plate-shaped member)" and "load detector" according to the present invention are not limited to those in the above-described embodiment.

Figure 11:
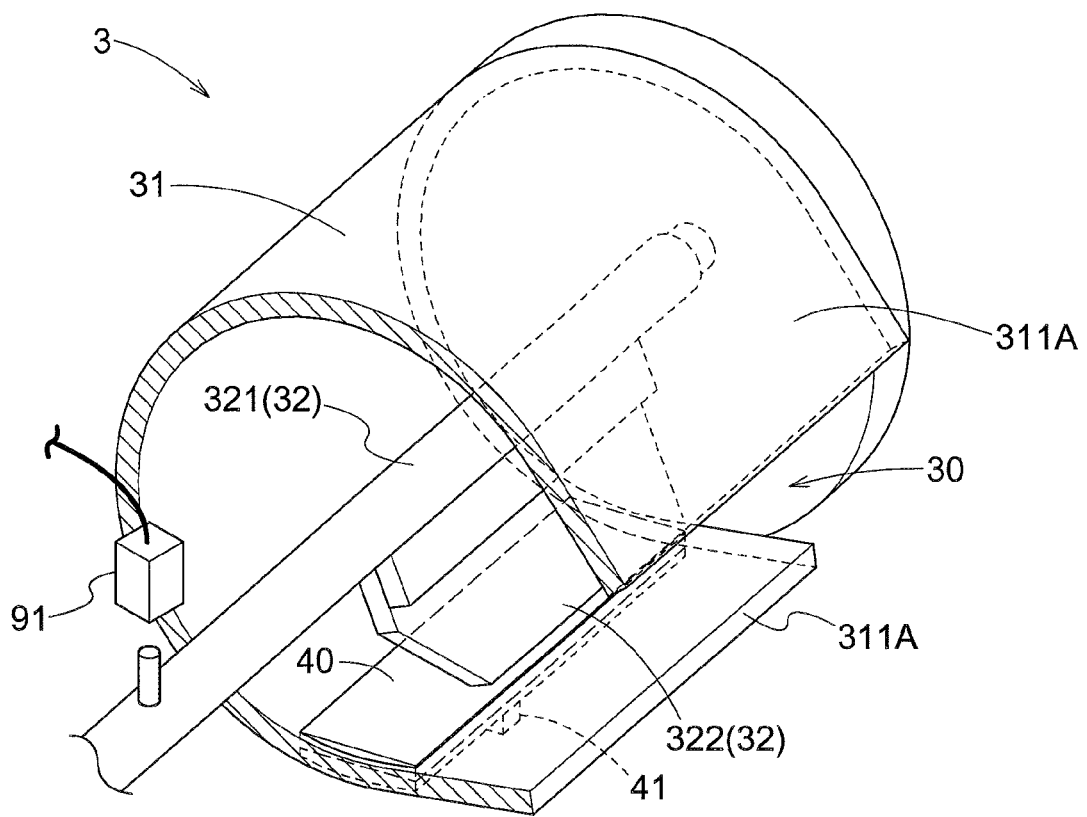
FIG. 11 is a view showing the grain discharge apparatus according to a variation (1)

As shown in FIG. 11, for example, a configuration may also be employed in which the pressed portion 40 has a wide width in the rotation axis direction of the blade 322, and the load detector 41 has a narrow width in the rotation axis direction of the blade 322. In FIG. 11, the pressed portion 40 spans one end portion and the other end portion of the grain discharge opening 30 in the rotation axis direction of the blade 322.

Figure 12:
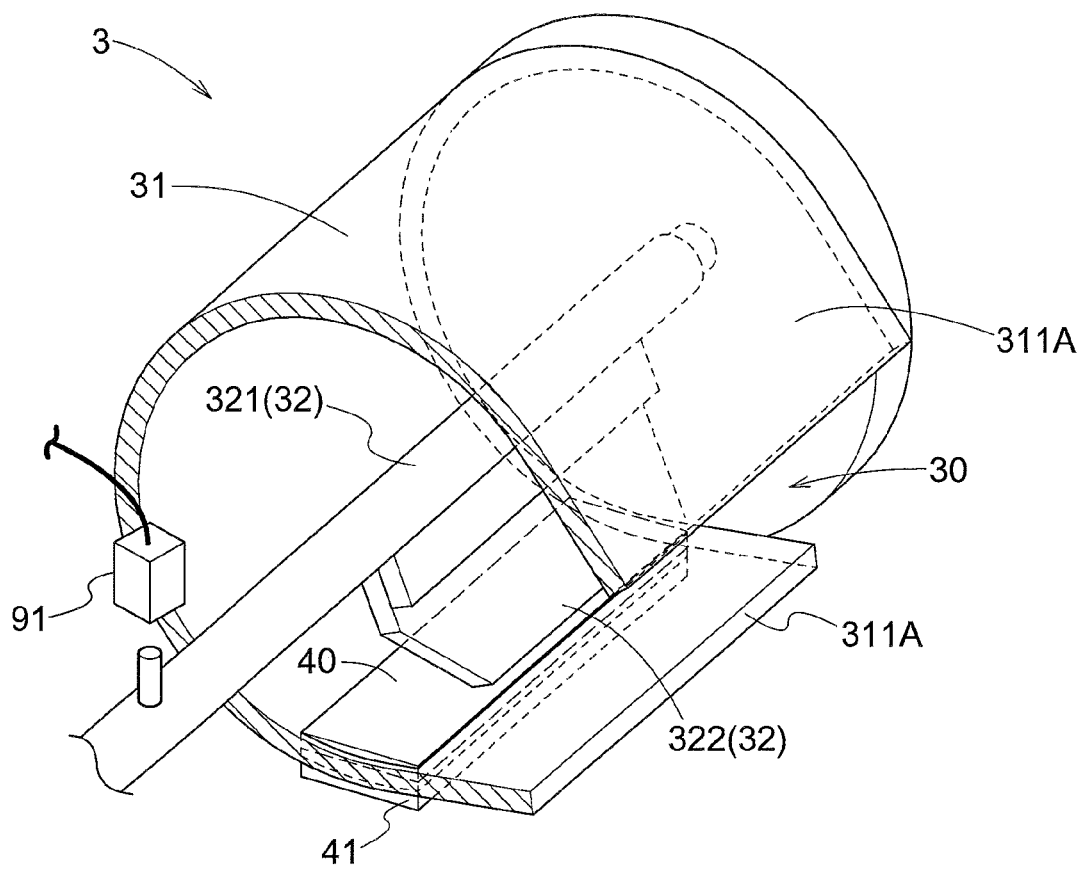
FIG. 12 is a view showing the grain discharge apparatus according to a variation (2)

(2) Alternatively, as shown in FIG. 12, a configuration may also be employed in which each of the pressed portion 40 and the load detector 41 has a wide width in the rotation axis direction of the blade 322. In FIG. 12, the pressed portion 40 and the load detector 41 span one end portion and the other end portion of the grain discharge opening 30 in the rotation axis direction of the blade 322.

(3) In the above embodiment, the yield is dealt with as grain yield status information. However, alternatively, a change in the yield, i.e. data on a change in the largest value (max) may simply be used as the grain yield status information. In this case, the grain yield distribution is relative data that indicates whether the yield in units of minute parcels is large or small. An absolute value of the yield in a field can be obtained based on the result of measurement of the amount of grain performed when the grains are conveyed from the grain tank 2.

Figure 9:
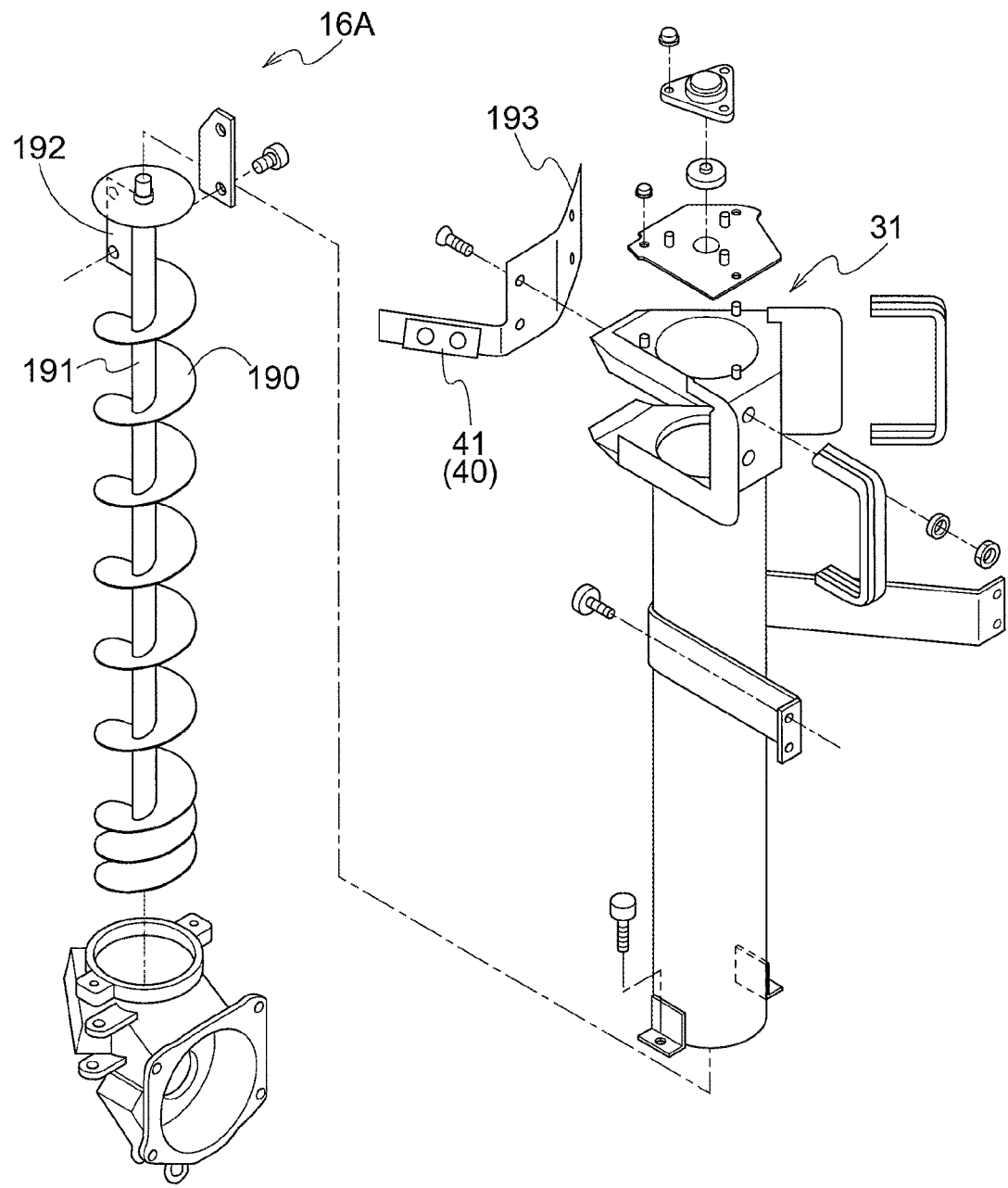
FIG. 9 is an exploded perspective view showing a variation of the grain discharge apparatus.
Figure 10:
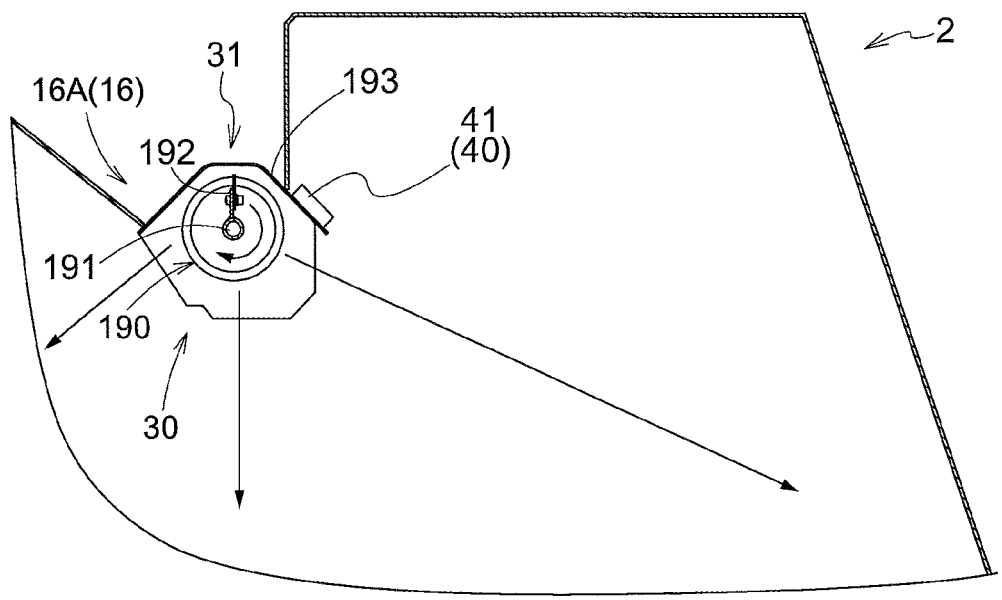
FIG. 10 is a plan view showing a variation of the grain discharge apparatus.

(4) In the above embodiment, the pressed portion 40 and the load detector 41 are provided in a portion of the discharge case 31 in the grain discharge apparatus 3 that is provided on the extension of the horizontal feed conveyor 16B. Since the mode of the grain discharge apparatus 3 is different depending on the type of combine harvester, the present invention is not limited to the above embodiment in terms of the mode of the grain discharge apparatus 3, as well as the shape and arrangement of the pressed portion 40 and the load detector 41. For example, in FIGS. 9 and 10, the grain discharge apparatus 3 is provided at the upper end of the lift conveyor 16A of a screw conveyer type that conveys grains to the upper side of the grain tank 2 from the bottom of the threshing apparatus 14. The grain discharge apparatus 3 includes a rotary blade 192, which is provided along the axial direction at the upper end of a shaft body 191 of a screw conveyer 190 that constitutes the lift conveyor 16A, and a blade cover 193 for covering this rotary blade 192. The blade cover 193 is open along the rotation trajectory of the rotary blade 192 in an area opposing a portion that faces the inside of the grain tank 2, and this opening serves as the grain discharge opening 30 for discharging grains. The rotary blade 192 flings out grains conveyed by the screw conveyer 190, from the grain discharge opening 30 into the grain tank 2. The blade cover 193 has a shape that allows the grains, which have been flung out, to accumulate in the grain tank 2 in a horizontally distributed state in a close-as possible uniform manner. A plate-shaped pressed portion 40 and the load detector 41, which is constituted by a load cell, are attached to a portion in a side wall of the blade cover 193 where grains are held between the blade cover 193 and the rotary blade 192 when the grains are discharged. Grains conveyed by the lift conveyor 16A are pressed against the side wall of the blade cover 193 by the rotary blade 192. Accordingly, a load that corresponds to the amount of grain is applied to the pressed portion 40. The load detector 41 (load cell) detects this load applied to the side wall.

(5) In the above embodiment, one blade 322 is provided on the rotary shaft 321. However, a plurality of blades 322 may be provided on the rotary shaft 321. In this regard, it is favorable that the blades 322 are arranged at equal intervals in the circumferential direction. In this case, the interval between rotation phases in which the peak to be detected as the largest value (max) (peak immediately before grains are discharged) is generated is not 360 degrees but a value obtained by dividing 360 degrees by the number of blades 322. To detect each peak as the largest value (max), the rotation cycle of the rotary shaft 321 may be divided into the same number of zones (hereinafter referred to as divided zones) as the number of blades 322 at a ratio that corresponds to the allocating pitch of the blades 322 in the rotational direction of the rotary shaft 321. In this case, if the blades 322 are configured to pass through the pressed portion 40 at a time point near the midpoint of each divided zone to obtain a peak timing, even if the peak timing is shifted slightly, a situation rarely occurs where no peak to be detected as the largest value (max) is included in one divided zone, or where two or more peaks are included in one divided zone. Note that, to divide the rotation cycle of the rotary shaft 321, a plurality of specific points may be set corresponding to the respective blades 322. In this case, the rotation angle sensor 91 generates the same number of pulses as the number of blades 322 for each rotation of the rotary shaft 321. Thus, the rotation cycle of the rotary shaft 321 is divided into the same number of pulse zones as the number of blades 322.

(6) In the above embodiment, the shape of the blade 322 is a flat plate. However, various shapes, such as a curved body, may be employed.

(7) Although the combine harvester in the above-described embodiment is a normal combine harvester, the present invention (including the configurations in the variations) is also applicable to a self-threshing combine harvester in which the pressed portion and the load detector are provided in the conveyance path in the grain conveyance mechanism.

Second Embodiment

The second embodiment will be described below.

Figure 13:
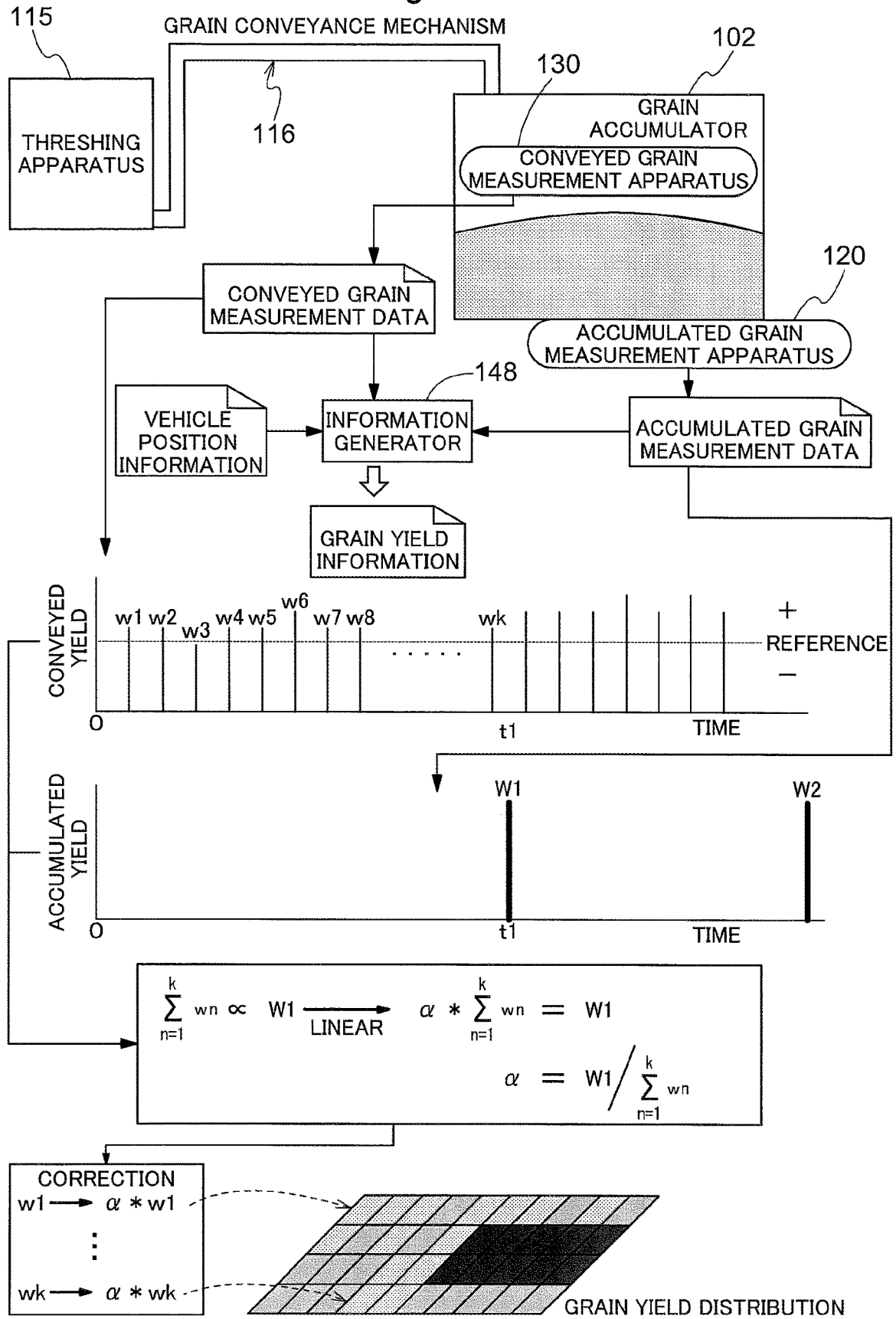
FIG. 13 is related to a second embodiment (which also applies to FIGS. 14 to 21) and is a schematic diagram showing a basic principle of a grain yield management system for a combine harvester.

Before describing the second embodiment in detail, a description will be given, using FIG. 13, of a basic principle of a grain yield management system for a combine harvester that is employed in the present invention. As shown in FIG. 13, the combine harvester includes a threshing apparatus 115 for threshing harvested grain culms, a grain tank 102 (an example of a grain accumulator), a grain conveyance mechanism 116 for conveying grains from the threshing apparatus 115 to the grain tank 102, a conveyed grain measurement apparatus 130 for measuring the amount of grain conveyed by the grain conveyance mechanism 116 during travel for reaping grain culms, and an accumulated grain measurement apparatus 120 for measuring the amount of gran accumulated in the grain tank 102. FIG. 13 schematically shows the threshing apparatus 115, the grain tank 102, the grain conveyance mechanism 116, the conveyed grain measurement apparatus 130, and the accumulated grain measurement apparatus 120. The conveyed grain measurement apparatus 130 performs measurement in short cycles in units of seconds, and outputs conveyed grain measurement data. The accumulated grain measurement apparatus 120 performs measurement at a point in time (denoted as t1 in FIG. 13) when grains are discharged from the grain tank 102 while the combine harvester is stopped, i.e. in a longer cycle than the measurement cycle of the conveyed grain measurement apparatus 130, and outputs accumulation grain measurement data.

FIG. 13 shows an example of a mechanism for calculating the conveyed yield based on the conveyed grain measurement data, and a mechanism for calculating the accumulated yield based on the accumulation grain measurement data. The conveyed grain measurement data, which is the conveyed yield calculated based on the conveyed grain measurement data that is outputted in a short measurement cycle, i.e. every short travel distance, is useful data for generating a yield distribution in each minute parcel (fraction) in the field. However, the conveyed grain measurement data may contain some errors, from the viewpoints that measurement is performed during travel for reaping grain culms and that the amount of all of the conveyed grain is measured. On the other hand, the accumulation grain measurement data, which is the result of measuring the weight of the grain tank 102 in a stable state where the combine harvester stands still, cannot be used in the yield distribution calculation but is reliable from the aforementioned viewpoints.

FIG. 13 also shows a method for converting conveyed yield values: w1, w2, . . . wk to values that indicate appropriate conveyed yields, based on the conveyed grain measurement data. Here, the conveyed yield values: w1, w2, . . . wk that are based on the conveyed grain measurement data outputted from the start until the point: t1 at which the accumulated grain measurement data is outputted is dealt with here. To obtain a correction coefficient for converting the conveyed yield values: w1, w2, . . . wk to values that indicate appropriate conveyed yields, an accumulated yield value: W1 is used, which is calculated based on the accumulated grain measurement data outputted from the accumulated grain measurement apparatus 120 at the point: t1. For the above-described reason, the accumulated yield value: W1 indicates a considerably accurate value as data on the measured total yield.

The fact that the integrated value of the conveyed yield values: w1, w2, . . . wk (integration data obtained by integrating the yield values that are based on the conveyed grain measurement data) corresponds to the accumulated yield value: W1 in a predetermined relationship is utilized for correcting the conveyed grain measurement data based on a comparative evaluation value, which is obtained by comparing and evaluating the integrated data with the accumulated grain measurement data. Specifically, assuming that the aforementioned predetermined relationship is a linear relationship, a coefficient: α (a kind of comparative evaluation value) is obtained with which the integrated value of the conveyed yield values: w1, w2, . . . wk (grain yield obtained by the integration) is equal to the accumulated yield value: W1 (grain yield that is based on the accumulated grain measurement data), and correction is performed by multiplying each of the conveyed yield values: w1, w2, . . . wk by this coefficient: α. Thus, the conveyed grain measurement data can be used as data that indicates the yield in each minute parcel in the field. Correction processing using the above-described accumulated grain measurement data and conveyed grain measurement data is performed by an information generator 148. Furthermore, in the case where position data that indicates the traveling position of the combine harvester in the field is inputted to the information generator 148, a grain yield distribution map of the field can be generated as an example of "grain yield information" regarding the field that is subjected to harvesting work, by combining the position data with the conveyed grain measurement data.

The information generator 148 can be incorporated in a control system in the combine harvester. However, at least a portion of the information generator 148 can be incorporated in a mobile terminal that can wirelessly communicate with the combine harvester and is carried by the operator. Also, at least a portion of the information generator 148 can also be incorporated in a computer system that is constructed in a management center in a remote place and is capable of wireless data communication with the combine harvester.

Figure 14:
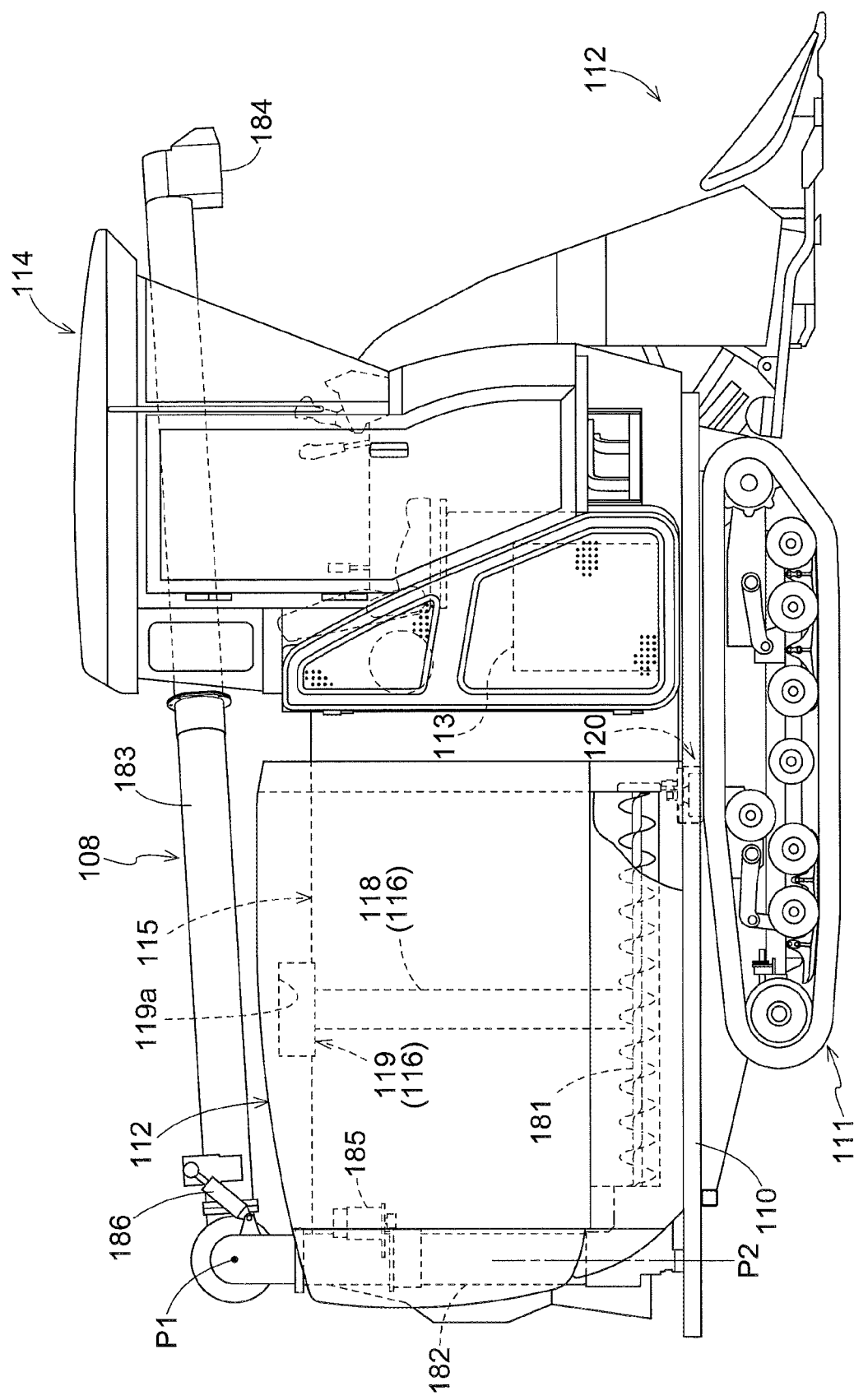
FIG. 14 is a side view of the combine harvester.
Figure 15:
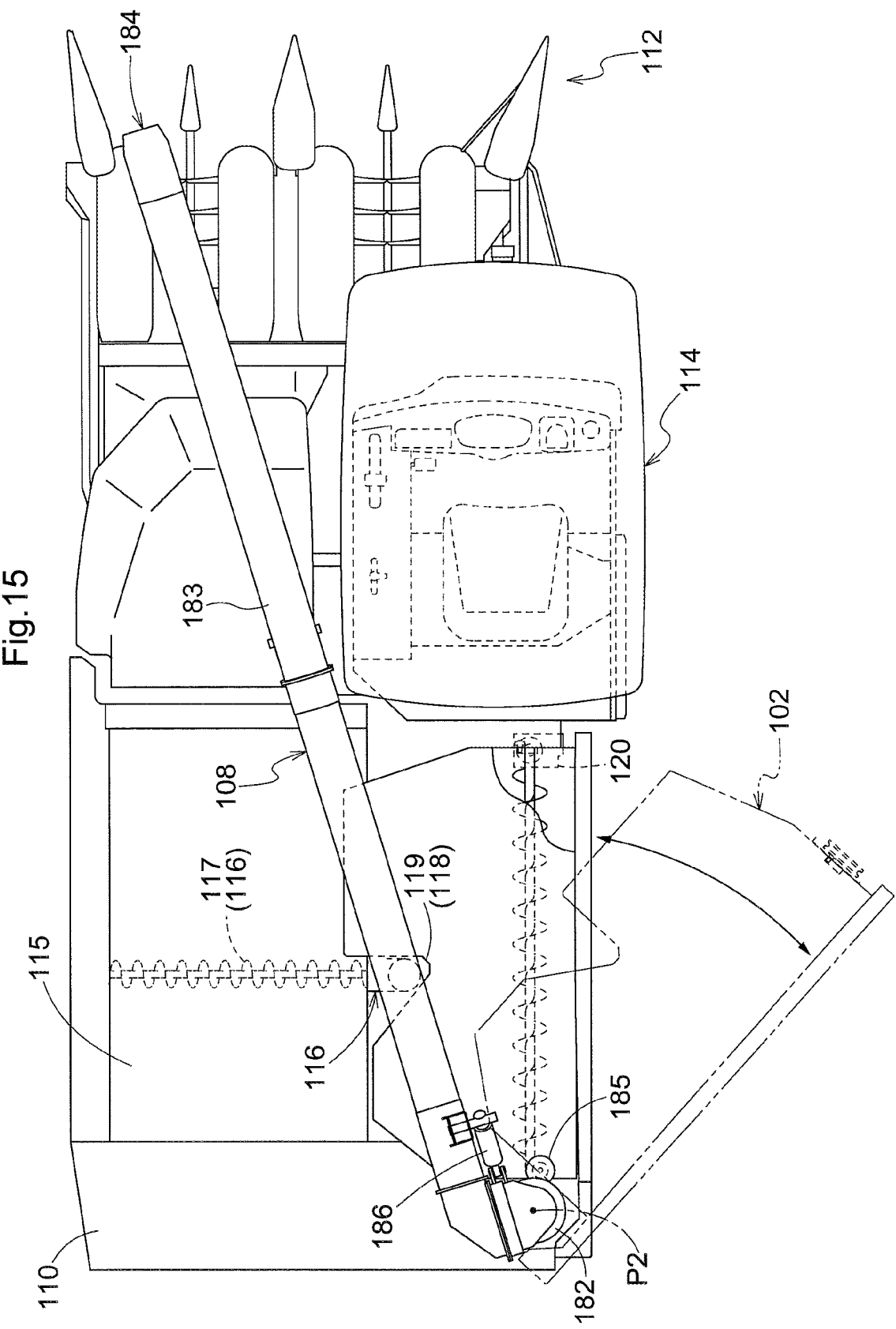
FIG. 15 is a plan view of the combine harvester.

Next, a specific embodiment of the grain yield management system for a combine harvester according to the present invention will be described using the drawings. FIG. 14 is a side view of a combine harvester in which the grain yield management system for a combine harvester is incorporated, and FIG. 15 is a plan view thereof. This combine harvester is of a self-threshing type, and a body frame 110 that constitutes a travelling body is supported relative to the ground by a pair of right and left crawler traveling apparatuses 111. A reaper/conveyer 112 for reaping planted grain culms that are to be harvested and conveying the reaped grain culms rearward of the machine body is arranged in a machine body front portion. Behind the reaper/conveyer 112, an operation unit 114, as well as a threshing apparatus 115 for threshing and sorting the reaped grain culms, a grain tank 102 serving as a grain accumulator for accumulating grains sorted and collected by the threshing apparatus 115, an unloader apparatus 108 for discharging grains from the grain tank 102, and so on, are arranged. An engine 113 is arranged below the operation unit 114.

The threshing apparatus 115 performs a threshing process from the ear side of the reaped grain culms conveyed from the reaper/conveyer 112, and sorts grains that have been separated into individual grains from dust and waste such as straw, by means of a sorting effect of a sorting mechanism (not shown) provided in the threshing apparatus 115. The grains that have been separated into individual grains are conveyed as the harvested crop to the grain tank 102.

As shown in FIGS. 14 and 15, the grains obtained as a result of the threshing and sorting performed by the threshing apparatus 115 are conveyed from the threshing apparatus 115 to the grain tank 102 by the grain conveyance mechanism 116. The grain conveyance mechanism 116 includes a clean grain collection screw 117, which is provided in a bottom portion of the threshing apparatus 115, and a grain lifting apparatus 118 of a screw conveyer type. The grains horizontally fed by the clean grain collection screw 117 are lifted up by the grain lifting apparatus 118. A discharging portion 119 is provided at an upper end of the grain lifting apparatus 118, and the grains are discharged into the grain tank 102 from an upper portion thereof through a discharge opening 119a of the discharging portion 119.

Figure 16:
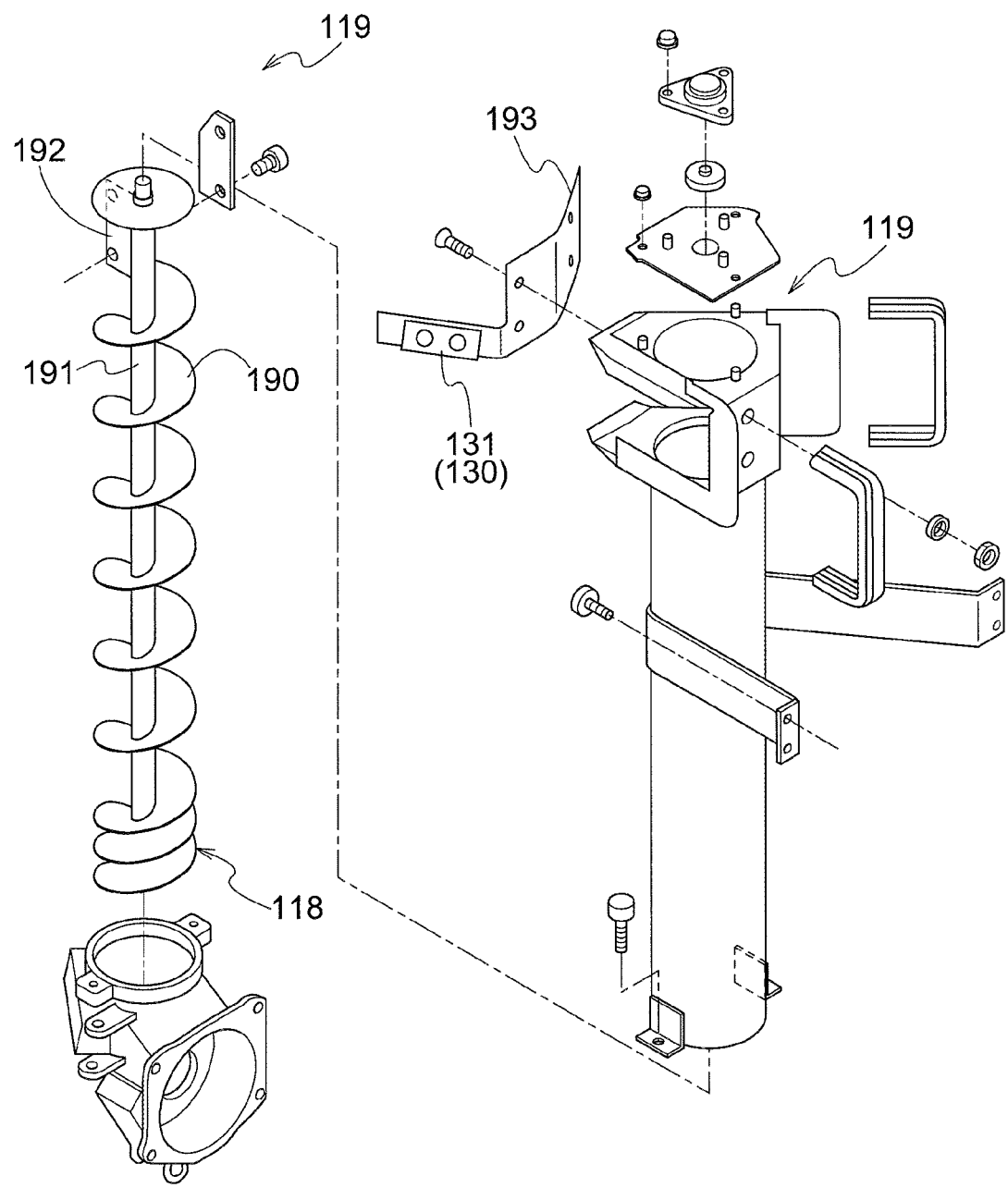
FIG. 16 is an exploded perspective view showing an example of a conveyed grain measurement apparatus.
Figure 17:
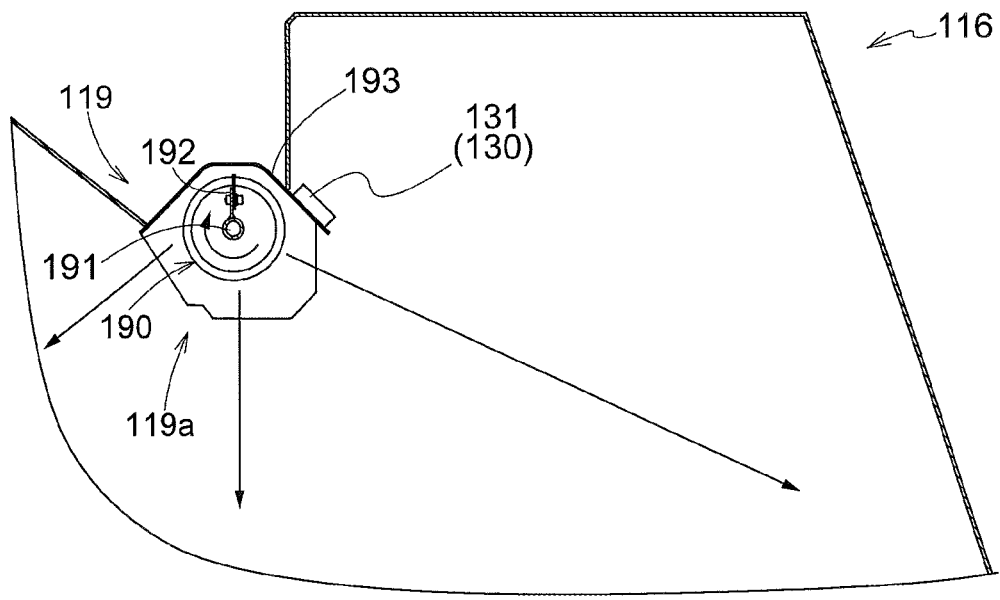
FIG. 17 is a plan view showing the example of the conveyed grain measurement apparatus.

As shown in FIGS. 16 and 17, the discharging portion 119 has a rotary blade 192 that is provided parallel to the axial direction, and a blade cover 193 that covers this rotary blade 192, at an upper end of a shaft body 191 of a screw conveyer 190 that constitutes the grain lifting apparatus 118. The blade cover 193 has an opening in an area thereof that opposes a portion of the rotation trajectory of the rotary blade 192, the portion facing the inside of the grain tank 102, and is open toward the inside of the grain tank 102, and this opening serves as the discharge opening 119a from which grains are discharged. Grains conveyed by the screw conveyer 190 are flung out from the discharge opening 119a by the rotary blade 192 toward the inside of the grain tank 102. The blade cover 193 has a shape that allows the grains to be accumulated in the grain tank 102 in a horizontally distributed state in the most uniform manner possible.

A first load cell 131, which constitutes the conveyed grain measurement apparatus 130, is provided in a side wall of the blade cover 193 at a position where grains are held between the side wall and the rotary blade 192 immediately before the grains are discharged. Grains conveyed by the grain lifting apparatus 118 are pressed against the side wall of the blade cover 193 by the rotary blade 192, and a load that corresponds to the amount of grain is exerted on the side wall of the blade cover 193. The first load cell 131 detects the load exerted on the side wall. A detection signal from the first load cell 131 corresponds to the conveyed grain yield, and is used as conveyed grain measurement data.

As shown in FIGS. 14 and 15, the unloader apparatus 108 includes a bottom screw 181, which is provided in the bottom portion of the grain tank 102, a vertical feed screw conveyer 182, which is provided on a body rear side of the grain tank 102, and a horizontal feed screw conveyer 183, which extends above the threshing apparatus 115. Note that a left bottom wall and a right bottom wall of the bottom portion of the grain tank 102 are inclined obliquely downward to form a wedge-like, downward tapered shape, and the bottom screw 181 is arranged at a tip area (deepest area) of this downward tapered shape. Grains accumulated in the grain tank 102 are fed from the bottom screw 181 to the horizontal feed screw conveyer 183 through the vertical feed screw conveyer 182, and are discharged to the outside from a discharge port 184 provided at a leading end of the horizontal feed screw conveyer 183. The vertical feed screw conveyer 182 can be rotated around a vertical axis P2 by an operation of an electric motor 185, and the horizontal feed screw conveyer 183 can be pivoted up and down around a horizontal axis P1 of its base end portion by a hydraulic cylinder 186. Thus, the discharge port 184 of the horizontal feed screw conveyer 183 can be positioned at a position from which grains can be discharged to a transport truck or the like outside the machine body. The grain tank 102 can pivot around the vertical axis P2, and the position thereof can be changed between a state of being stored in the machine body and a state of protruding outward of the machine body.

As shown in FIGS. 14 and 15, this combine harvester includes a second load cell 121, which constitutes the accumulated grain measurement apparatus 120 that measures the weight of the grain accumulated in the grain tank 102 and outputs the measurement result as accumulated grain measurement data. The second load cell 121 is placed on and supported by the body frame 110 immediately below a lower portion of the grain tank 102 that corresponds to a front end portion of the bottom screw 181. Thus, the weight of the grain tank 102 acts on the second load cell 121 in a balanced manner, and accumulated grain measurement data can be measured accurately.

Figure 18:
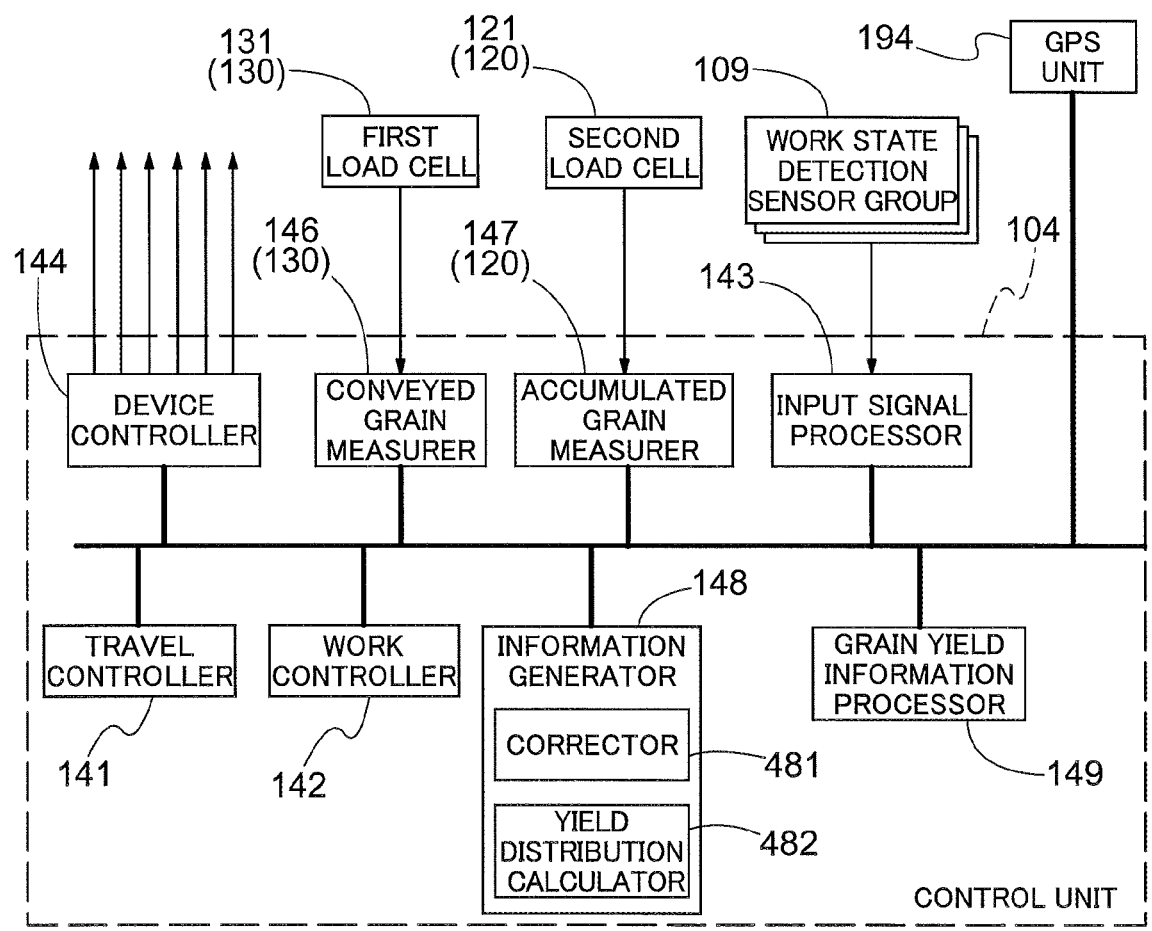
FIG. 18 is a functional block diagram showing functional portions of a control system.

FIG. 18 shows some of the functional blocks in a control unit 104 in the combine harvester. Control functions related to yield measurement in this combine harvester are substantially based on the basic principle described using FIG. 13. The control unit 104 includes, as modules for controlling operations of respective devices in the combine harvester, a travel controller 141 for controlling devices associated with travel, a work controller 142 for controlling devices associated with working machines, and an input signal processor 143. Control signals generated by the travel controller 141 and the work controller 142 are sent to various devices via a device controller 144. The input signal processor 143 receives signals from a manual operation device and signals from a work state detection sensor group 109, which includes sensors for detecting the state of devices included in the combine harvester, switches, and the like, and transfers the received signals to the respective functional portions in the control unit 104. This combine harvester includes a GPS unit 194 for detecting the vehicle position. Vehicle position data, which is azimuth information acquired by the GPS unit 194, is also inputted to the control unit 104.

A conveyed grain measurer 146, an accumulated grain measurer 147, and the information generator 148, which serve as functional modules associated with yield measurement, are constructed in the control unit 104. The conveyed grain measurer 146 measures the amount of grain conveyed by the grain conveyance mechanism 116 (conveyed yield) based on a detection signal from the first load cell 131 in a short cycle (e.g. in a cycle of several seconds), and outputs the conveyed grain measurement data regarding a unit yield per unit of time or a unit yield per unit of travel. For example, the accumulated grain measurer 147 measures the amount of grain accumulated in the grain tank 102 (accumulated yield) based on a detection signal from the second load cell 121 every time grains are discharged (unloaded) from the grain tank 102, and outputs accumulated grain measurement data, which indicates the amount of grain accumulated in the grain tank 102. That is to say, in this embodiment, the first load cell 131 and the conveyed grain measurer 146 are elements that constitute the conveyed grain measurement apparatus 130, and the second load cell 121 and the accumulated grain measurer 147 are elements that constitute the accumulated grain measurement apparatus 120.

The conveyed grain measurer 146 has a table (lookup table) for deriving a yield per unit of conveyance (a kind of conveyed grain measurement data) based on a processed signal obtained by, for example, filtering the detection signal from the first load cell 131. The accumulated grain measurer 147 has a table (lookup table) for deriving a yield of accumulated grains harvested from the start of work up until unloading, or between two instances of unloading (a kind of accumulated grain measurement data), based on a processed signal obtained by, for example, filtering the detection signal from the second load cell 121.

Employing the basic principle described using FIG. 13, the information generator 148 generates information (grain yield information) regarding the yield in each minute parcel in the field in which harvest work is currently being performed (a field that is subjected to harvest work), based on the conveyed grain measurement data outputted from the conveyed grain measurer 146 and the accumulated grain measurement data outputted from the accumulated grain measurer 147. The position in the field at which grains subjected to the measurement for the conveyed grain measurement data were harvested is calculated, giving consideration to the vehicle position data sent from the GPS unit 194 and a time delay occurring between a reaping position and a measurement position due to conveyance of grains. Each piece of conveyed grain measurement data is assigned to a corresponding minute parcel in the field by matching the calculated position and a field map.

As shown in FIG. 18, the information generator 148 includes a corrector 481 and a yield distribution calculator 482. The corrector 481 corrects the conveyed yield value that is based on the accumulated grain measurement data, using a factor of proportionality: $\alpha$, which indicates the relationship between the conveyed yield value that is based on the conveyed grain measurement data outputted from the conveyed grain measurer 146 until the accumulated grain measurement data is outputted from the accumulated grain measurer 147, and the accumulated yield value that is based on this accumulated grain measurement data, as described using FIG. 13. Thus, the yield per unit of traveling time or unit of travel distance, i.e. the yield in each minute parcel can be appropriately obtained. The yield distribution calculator 482 calculates a yield distribution (distribution of the grain yield per parcel unit in the field) by using the yield in each minute parcel.

The yield distribution calculated by the yield distribution calculator 482 is recorded as a piece of the grain yield information in a recording medium by a grain yield information processor 149. At this time, the field name, the type of harvested crop, and the like, are also recorded as attribute values of the yield. The grain yield information processor 149 generates a yield distribution map, which visualizes the yield distribution, and outputs the generated yield distribution map to a monitor or a printer.

Figure 20:
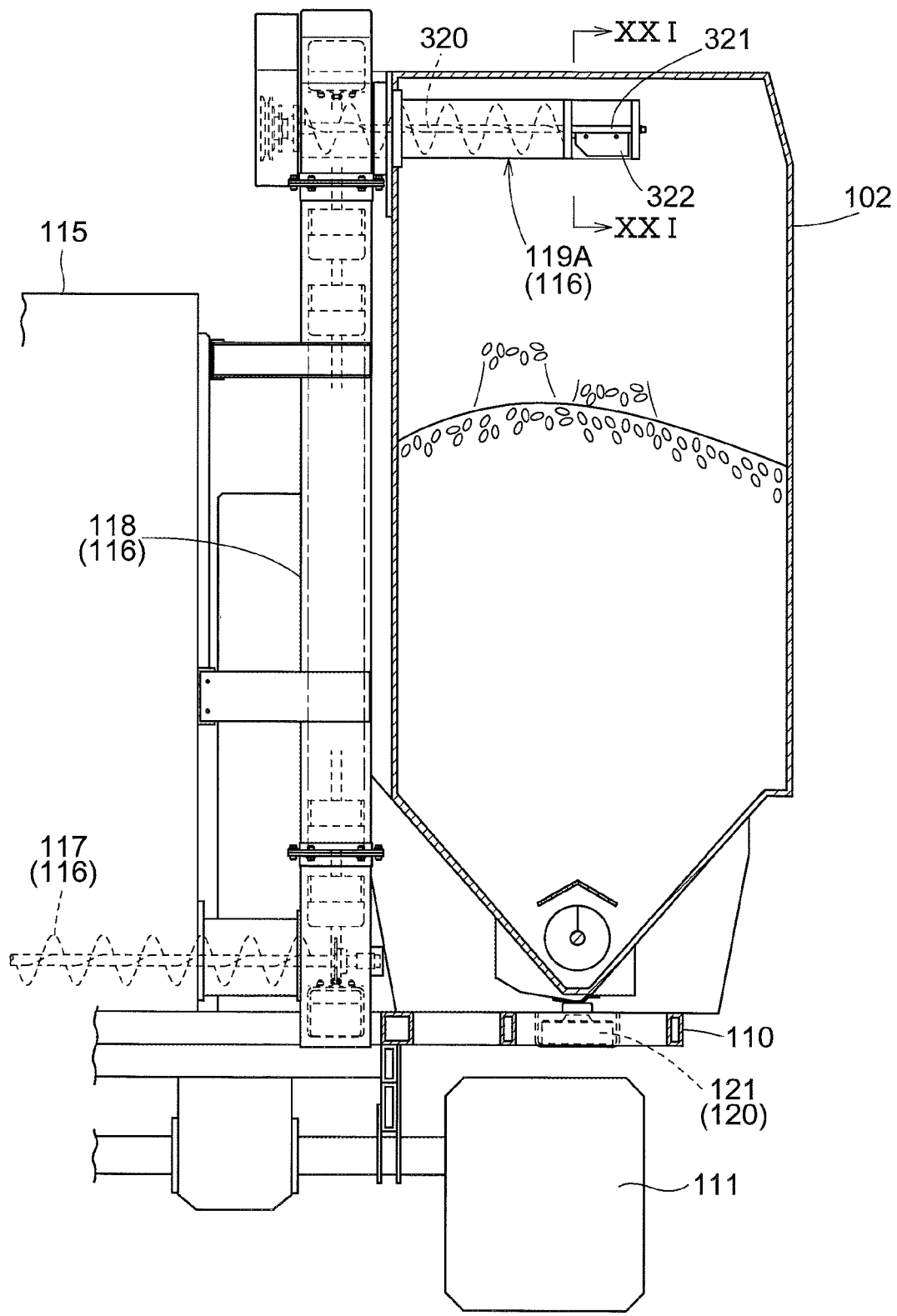
FIG. 20 is a view in vertical section of the combine harvester that includes the conveyed grain measurement apparatus according to the variation (1)
Figure 21:
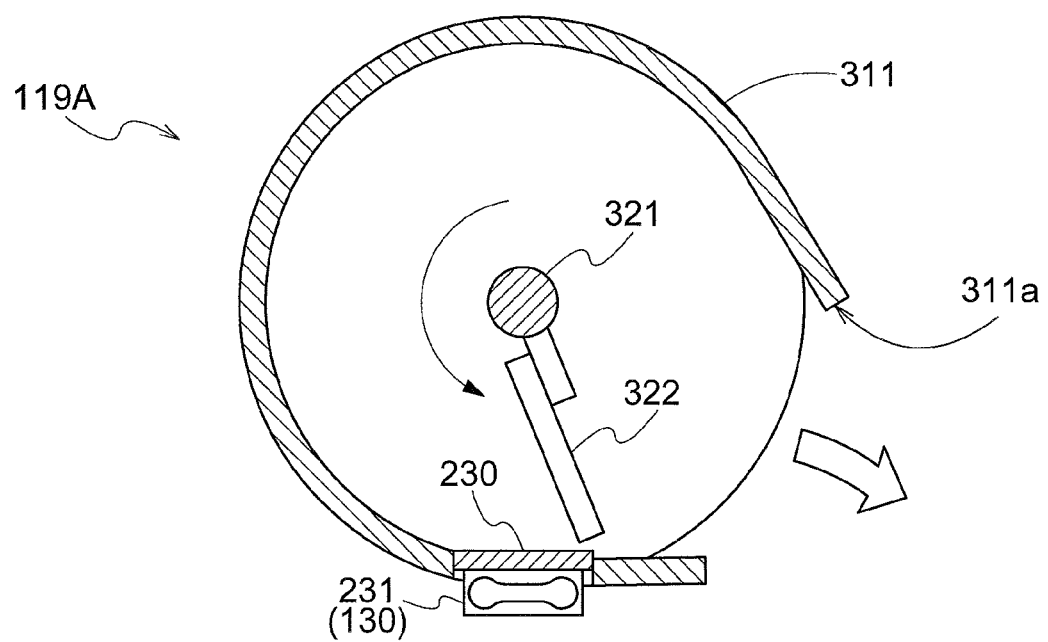
FIG. 21 is a side view in vertical section, taken along arrows XXI-XXI in FIG. 20, of the conveyed grain measurement apparatus according to the variation (1).

Variations of Second Embodiment (1) The above embodiment has described the conveyed grain measurement apparatus 130 for measuring grains conveyed by the grain lifting apparatus 118 of a screw conveyer type. However, for example, there are also combine harvesters in which grains are lifted by a grain lifting apparatus 118 of a bucket type, as shown in FIGS. 20 and 21. For this reason, a description will be given below of a conveyed grain measurement apparatus 130 that is mounted in a combine harvester equipped with the grain lifting apparatus 118 of a bucket type. Descriptions of the same constituent elements as those in the above embodiment are omitted in principle, and these constituent elements are assigned the same signs in the drawings.

Figure 19:
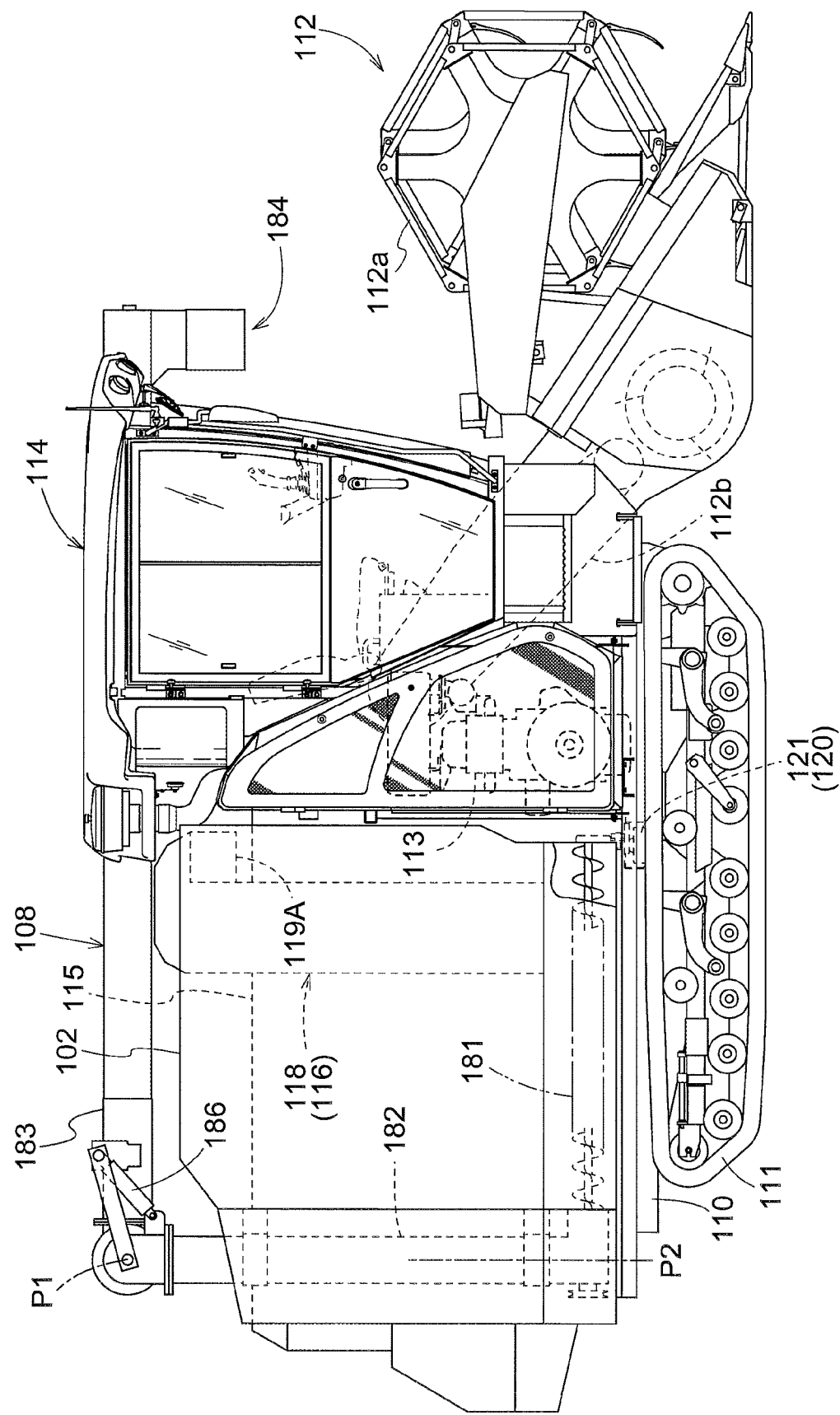
FIG. 19 is a side view of a combine harvester that includes a conveyed grain measurement apparatus according to a variation (1)

FIGS. 19 and 20 show a normal combine harvester. The normal combine harvester harvests grain culms in the field while raking them using a raking reel 112a, and conveys the harvested grain culms to the threshing apparatus 115 using a feeder 112b.

As shown in FIGS. 19 and 20, the grain conveyance mechanism 116 includes the clean grain collection screw 117, the bucket-type grain lifting apparatus 118, and a discharge portion 119A. The discharge portion 119A is put into an upper front portion of the grain tank 102 so as to be oriented in a right-left direction relative to the machine body. The discharge portion 119A includes a horizontal feed screw 320 for horizontally feeding grains received from the grain lifting apparatus 118 toward the inside of the tank, the blade 322 provided at a leading end of the rotation shaft 321 of the horizontal feed screw 320, and a discharge case 311 that houses the horizontal feed screw 320 and the blade 322. A discharge opening 311*a*, which is open toward a rear wall of the grain tank 102, is formed in a rear portion of the discharge case 311. As shown in FIG. 21, conveyed grains are discharged from the discharge opening 311*a* toward the inside of the grain tank 102 as a result of the blade 322 rotating.

As shown in FIG. 21, an opening, which extends in the rotational direction of the blade 322 within the width in the axial direction of the blade 322, is provided in a portion of a circumferential wall portion of the discharge case 311, the portion being forward of the discharge opening 311*a* in the rotational direction of the blade 322, and a pressed portion 230, which is formed with a plate-shaped member, is attached to this opening. The first load cell 231 for detecting the load of grains that is exerted on the pressed portion 230 when the grains are discharged by the blade 322 is provided in an outer face of the pressed portion 230. That is to say, in this embodiment, the first load cell 231 constitutes the conveyed grain measurement apparatus 130.

(2) Sectioning of various functional portions shown in FIGS. 13 and 18 is an example, and the functional portions may also be integrated or divided in any way. Any configuration may be employed as long as the control functions of the present invention are realized, and these functions can be realized by hardware or software, or both of them.

(3) In the above embodiment, the relationship between the integrated value of the yield values that are based on the conveyed grain measurement data outputted from the conveyed grain measurer 146 and the yield value that is based on the accumulated grain measurement data is regarded as a linear relationship. However, the yield value that is based on the accumulated grain measurement data may also be corrected by using any other kind of relationship, a quadratic relationship, or a non-linear relationship.

(4) In the above embodiment, the yield distribution calculator 482 calculates the yield distribution using an absolute yield value. However, any other value, e.g. a change in the yield between minute parcels obtained by calculating only the ratio of increase/decrease based on the conveyed grain measurement data may also be calculated as the yield distribution.

(5) In the above embodiment, the grain accumulator is the grain tank 102 that accommodates grains discharged from the grain conveyance mechanism 116 and discharges grains using the unloader apparatus 108 toward a transport track or the like. Instead of this configuration, the grain accumulator may also be constituted by a hopper and a bagging apparatus for bagging every predetermined yield unit of grains discharged from the hopper. At this time, the measurer in the conveyed grain measurement apparatus 130 can be incorporated in the grain conveyance mechanism 116 or the hopper, and the measurer in the accumulated grain measurement apparatus 120 can be incorporated in the bagging apparatus.

(6) Although the above embodiment has described a combine harvester that measures the yield, the combine harvester may also include a component sensor for measuring grain component values (such as a moisture value and a protein value), and create a quality yield distribution map by combining the above-described grain yield information data and data regarding the components measured by the component sensor.

(7) Although the combine harvester in the embodiment shown in FIGS. 14 to 18 is a self-threshing combine harvester, the present invention is also applicable to a normal combine harvester in which the conveyed grain measurement apparatus 130 is provided at the same position. Although the combine harvester according to the variation (1) shown in FIGS. 19 to 21 is a normal combine harvester, the present invention is also applicable to a self-threshing combine harvester in which the conveyed grain measurement apparatus 130 is provided at the same position.

INDUSTRIAL APPLICABILITY

The present invention is applicable to a combine harvester in which threshed grains are accumulated in a grain tank by a grain conveyance mechanism.

DESCRIPTION OF REFERENCE SIGNS

First Embodiment

2 Grain tank
6 Yield evaluator
14 Threshing apparatus
16 Grain conveyance mechanism
30 Grain discharge opening
31 Discharge case
32 Discharge rotor
40 Pressed portion (plate-shaped member (pressure sensitive plate))
41 Load detector (load cell)
91 Rotation angle sensor
321 Rotary shaft (of discharge rotor 32)
322 Blade (of discharge rotor 32)

Second Embodiment

102 Grain tank
115 Threshing apparatus
116 Grain conveyance mechanism
130 Conveyed grain measurement apparatus
148 Information generator
230 Pressed portion
481 Corrector
482 Yield distribution calculator

What is claimed is:
1. A combine harvester comprising:
a threshing apparatus;
a grain tank for accumulating grains threshed by the threshing apparatus;
a grain conveyance mechanism for conveying grains from the threshing apparatus to the grain tank;
a pressed portion that is subjected to a pressing force applied by grains in a conveyance path in the grain conveyance mechanism;
a load detector for detecting the pressing force exerted on the pressed portion;
a yield evaluator for evaluating an amount of conveyed grain based on a detection signal from the load detector,
a grain discharge apparatus provided in an end area of the grain conveyance mechanism, the grain discharge apparatus having a discharge case provided with a grain discharge opening, and a discharge rotor rotatably arranged in the discharge case,
wherein the pressed portion is subjected to a pressing force applied by grains before the grains are discharged by the discharge rotor, and wherein the yield evaluator evaluates the amount of conveyed grain per rotation cycle of the discharge rotor, based on the detection signal from the load detector in the rotation cycle.

2. The combine harvester according to claim 1, wherein the pressed portion is subjected to a pressing force applied by grains before the grains are discharged by the discharge rotor.

3. The combine harvester according to claim 2, wherein a plate-shaped member that serves as the pressed portion is attached to the discharge case at a position forward of the grain discharge opening in a direction in which grains are conveyed, and wherein the pressing force applied by grains passing between the discharge rotor and the pressed portion is exerted on the pressed portion.

4. The combine harvester according to claim 3, wherein the plate-shaped member is formed as a pressure sensitive plate extending in a rotational direction of the discharge rotor, and the load detector is a load cell provided in the pressure sensitive plate.

5. The combine harvester according to claim 3, wherein the plate-shaped member spans one end portion and another end portion of the grain discharge opening in a rotation axis direction of the discharge rotor.

6. The combine harvester according to claim 2, wherein the discharge case is a cylindrical body having a cylindrical portion with a center that is a rotation axis of the discharge rotor, the cylindrical body extending along the rotation axis, the grain discharge opening is provided in a portion of an inner circumferential face of the cylindrical body, and the pressed portion is provided in a circumferential face portion of the inner circumferential face, the circumferential face portion being located forward of the grain discharge opening in a rotational direction of the discharge rotor.

7. The combine harvester according to claim 1, wherein the yield evaluator evaluates the amount of conveyed grain per unit of travel distance by integrating a largest value of the detection signal from the load detector obtained every rotation cycle, during a period of time it takes for the combine harvester to travel the unit of travel distance.

8. The combine harvester according to claim 1, wherein the discharge rotor is a rotary blade constituted by a rotary shaft and a blade provided on the rotary shaft, and the rotary blade has a grain pushing face for pushing out grains in a rotational direction.

9. The combine harvester according to claim 8, further comprising:

a rotation angle sensor for detecting a rotation angle of the rotary blade, wherein the rotation angle sensor is a sensor that detects a specific point in a circumferential direction of the rotary blade, and the yield evaluator calculates a rotation cycle of the discharge rotor based on the specific point in the circumferential direction, and regards a period, in which a largest value of the detection signal from the load detector is generated in the rotation cycle of the discharge rotor, as a periode valuated by the yield evaluator.

10. The combine harvester according to claim 9, wherein, at a time point near a middle point in a period from when a pulse signal that is based on the detection signal from the rotation angle sensor is generated until the next pulse signal is generated, the blade passes the pressed portion, and the detection signal from the load detector takes its largest value.

* * * * *

UNITED STATES PATENT AND TRADEMARK OFFICE
CERTIFICATE OF CORRECTION

| | |
|---|---|
| PATENT NO. | : 10,945,368 B2 |
| APPLICATION NO. | : 15/776370 |
| DATED | : March 16, 2021 |
| INVENTOR(S) | : Ueda et al. |

It is certified that error appears in the above-identified patent and that said Letters Patent is hereby corrected as shown below:

On the Title Page

Item (30), Foreign Application Priority Data, Line 1, below "JP2015-254510" insert -- December 25, 2015 (JP) JP2015-254614 --

In the Claims

Column 22, Line 26, Claim 9, delete "periode valuated" and insert -- period evaluated --

Signed and Sealed this
Third Day of May, 2022

Katherine Kelly Vidal
*Director of the United States Patent and Trademark Office*